United States Patent [19]
Nanba

[11] Patent Number: 5,687,025
[45] Date of Patent: Nov. 11, 1997

[54] IMAGE DISPLAY APPARATUS AND IMAGE PICKUP APPARATUS

[75] Inventor: Norihiro Nanba, Kawasaki, Japan

[73] Assignee: Canon Kabushiki Kaisha, Tokyo, Japan

[21] Appl. No.: 651,298

[22] Filed: May 22, 1996

[30] Foreign Application Priority Data

May 25, 1995 [JP] Japan ................... 7-150977
May 14, 1996 [JP] Japan ................... 8-143686

[51] Int. Cl.$^6$ ........................... G02B 27/14
[52] U.S. Cl. ............... 359/633; 359/631; 359/630
[58] Field of Search ................... 359/630, 631, 359/633

[56] References Cited

U.S. PATENT DOCUMENTS

| | | | |
|---|---|---|---|
| 5,341,242 | 8/1994 | Gilboa et al. | 359/631 |
| 5,384,654 | 1/1995 | Iba | 359/364 |
| 5,436,765 | 7/1995 | Togino | 359/631 |
| 5,473,365 | 12/1995 | Okamura | 348/53 |
| 5,479,224 | 12/1995 | Yasugaki | 353/101 |
| 5,513,041 | 4/1996 | Togino | 359/631 |
| 5,526,183 | 6/1996 | Chen | 359/629 |

FOREIGN PATENT DOCUMENTS

| | | |
|---|---|---|
| 0632393A1 | 8/1988 | European Pat. Off. . |
| 0660155A1 | 9/1988 | European Pat. Off. . |
| 06242396A | 9/1994 | Japan . |

Primary Examiner—Georgia Y. Epps
Assistant Examiner—Ricky Mack
Attorney, Agent, or Firm—Morgan & Finnegan

[57] ABSTRACT

The present invention relates to an image display apparatus disposed near an observer's head for observing an image displayed on image display means as an enlarged virtual image. The apparatus has a relay optical system for causing the displayed image by the image display means to be intermediately formed, the relay optical system having at least one decentered reflecting surface for bending a light beam from the image display means, and at least one lens of an anamorphic aspherical shape differing in curvature in any orthogonal direction, and an eyepiece optical system for directing the image by the relay optical system to the observer's pupil, the eyepiece optical system having at least one decentered reflecting surface which is an anamorphic aspherical surface of a concave surface shape for bending the light beam from the relay optical system.

11 Claims, 23 Drawing Sheets

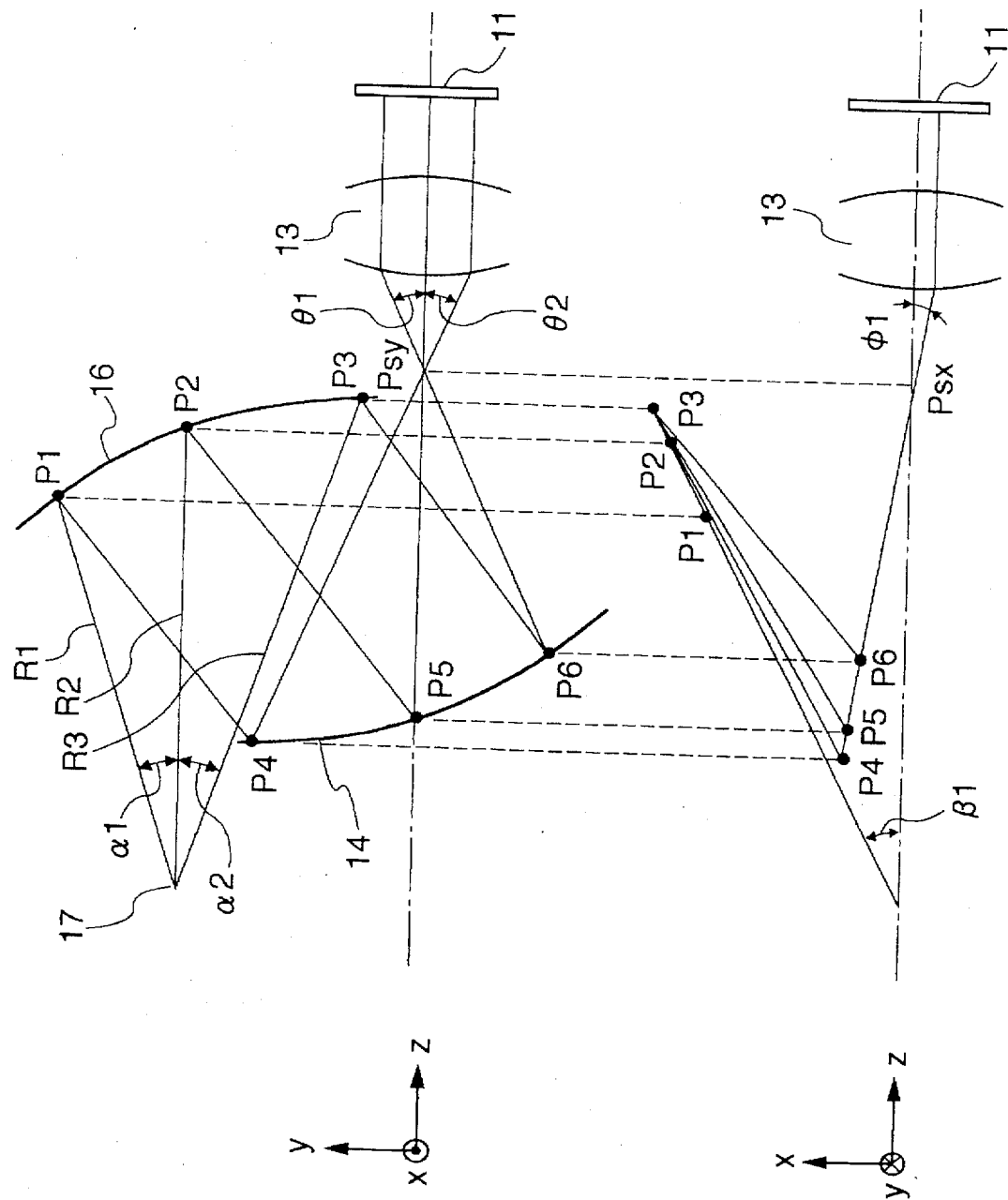

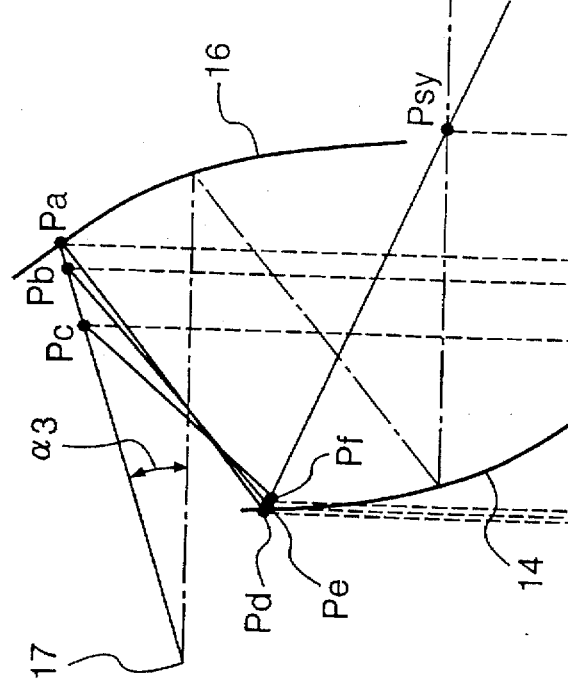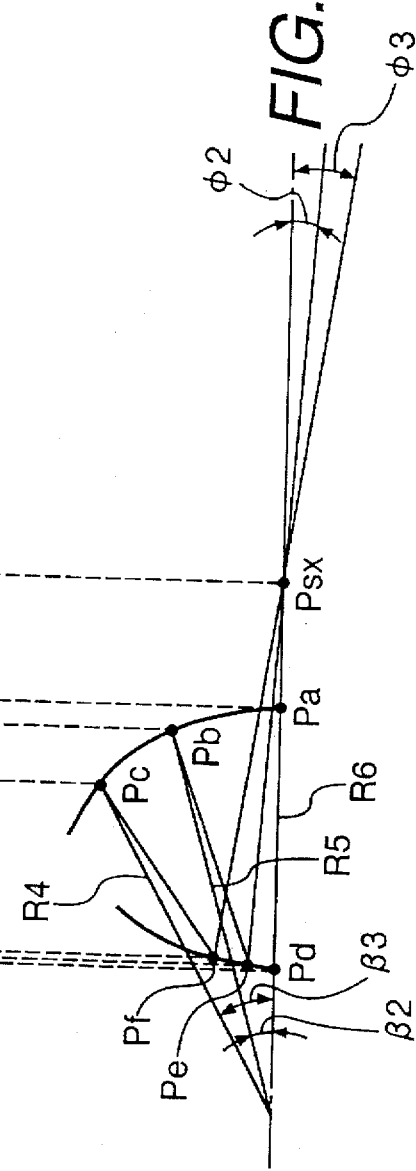
FIG. 4A
FIG. 4B

IMAGE DISPLAY APPARATUS AND IMAGE PICKUP APPARATUS

BACKGROUND OF THE INVENTION

1. Field of the Invention

This invention relates to an image display apparatus disposed near an observer's eyes for observing thereby an image on image display means as an enlarged virtual image, and particularly to an image display apparatus having a see-through function of observing the displayed image as it is superposed on an exterior and achieving imaging performance good in quality of image in which distortion is well corrected.

2. Related Background Art

Image display apparatuses disposed near an observer's eyes include a helmet-mounted display made integral with a helmet and a head-mounted display having a support member mounted on the head which is more compact and lighter in weight. Any of these enlargedly displays an image displayed on an image display apparatus such as a CRT or an LCD as a virtual image ahead of the observer through an observation optical system, and the construction of the optical system is broadly classified into one using a reflecting optical system as an eyepiece optical system in the observation optical system and one not using it.

A typical example not using the reflecting optical system is the optical system of an electric viewfinder used in a video camera or the like. This optical system makes an image displayed on image display means such as an LCD into a virtual image by an eyepiece and enlargedly displays it to the observer. In this system, however, the image display means is disposed on a visual axis and cannot therefore have the so-called see-through function of observing the displayed image as it is superposed on an exterior.

In contrast, in the case of the system having the reflecting optical system, a reflecting surface is disposed on the observer's pupil side. This reflecting surface acts as a beam splitter, and can combine a light beam from image display means displayed disposed of the observer's visual axis and a light beam from an exterior together to thereby achieve the see-through function.

An apparatus using a reflecting optical system is classified into one of which the observation optical system is a coaxial system and one of which the observation optical system is a decentered system. As examples in which the observation optical system is a coaxial system, there are known Japanese Laid-Open Patent Application No. 3-39924, U.S. Pat. No. 5,151,722, etc.

In the construction wherein the observation optical system is a decentered system, there is disclosed in U.S. Pat. No. 4,854,688 an optical system in which an eyepiece system is inclined as a spherical decentered reflecting surface with respect to an observer's visual axis. In U.S. Pat. Nos. 3,787,109, 4,026,641, 3,816,005, there are disclosed optical systems in which eyepiece systems are decentered reflecting surfaces of the shapes of a paraboloid of revolution, a toric surface and an elliptical surface of revolution, respectively, and in U.S. Pat. No. 3,923,370, there is disclosed an optical system in which decentered reflecting of surfaces of the shape of a paraboloid of revolution are applied to both of an eyepiece system and a relay system.

As a modification of U.S. Pat. No. 3,923,370, as seen in U.S. Pat. No. 4,761,056 and Japanese Laid-Open Patent Application No. 2-297516, there is an optical system in which the system between the two paraboloids of revolution is turned back by a plurality of reflecting surfaces.

As conventional examples treating the technical tasks of the decentered system, there is disclosed in Japanese Laid-Open Patent Application No. 5-303055 a construction in which decentration distortion caused by the eyepiece system when the eyepiece system is a decentered reflecting surface and the relay system is a refracting system is corrected by the inclination decentering of the relay system, and there is disclosed in Japanese Laid-Open Patent Application No. 5-303056 a construction in which the eyepiece system is an aspherical reflecting surface reduced in the creation of trapezoidal distortion.

When two observation optical systems are disposed for both-eye observation, the outer diameter of the reflecting surface of the eyepiece system must be smaller than at least the base length of the observer's right and left eyes. In Japanese Laid-Open Patent Application No. 3-39924 and U.S. Pat. No. 5,151,722 which are conventional examples of the coaxial optical system, a plane beam splitter is disposed between an eye point and an eyepiece reflecting surface. Therefore, there is a problem that the distance from the eye point to the eyepiece reflecting surface becomes long and the outer diameter of the eyepiece reflecting surface becomes large and thus, the angle of field cannot be secured greatly. Also, in the plane beam splitter, there is another problem that a light beam from image display means is reflected and transmitted and therefore, the loss of the quantity of light is great and a bright virtual image cannot be obtained.

In U.S. Pat. No. 4,854,688 which discloses the construction of the decentered system, the reflecting surface of the eyepiece system is inclined with respect to the visual axis, whereby the angle of field can be made somewhat greater than in the coaxial system, but since a plane beam splitter is used, a much wider angle of field cannot be expected and a similar problem exists about the loss of the quantity of light. Also, in this patent, there is a problem that decentration aberrations newly created by the reflecting surface being made decentered, particularly, decentration distortion, is not corrected. Thus, the observer observes a distorted virtual image. To correct decentration aberrations created in an optical system, a complicated measure such as effecting the display of an image with the image converted into a converse distorted shape becomes necessary.

In U.S. Patent Nos. 3,787,109, 4,026,641 and 3,816,005 mentioned as other conventional examples, a plane beam splitter is not used and therefore, an eyepiece reflecting surface (so-called combiner) for combining light beams from an exterior and image display means is only required against the loss of the quantity of light, but since the decentered reflecting surface comprises only one surface, decentration distortion cannot be corrected.

Also, curvature of image field occurs in the eyepiece system and therefore, when a flat panel such as an LCD is used, it is necessary to form a curved image surface by a face plate or the like using a bundle of fibers and effect correction. However, when a bundle of fibers is used, the NA of a light beam on the entrance and exit sides cannot be made great and there is a limit to bringing the fibers into high density.

In U.S. Pat. No. 3,923,370 which is a modification of the decentered system, spherical aberration and coma created in an eyepiece reflecting surface of the shape of a paraboloid of revolution are corrected by a reflecting surface of the shape of a paraboloid of revolution in a relay system, but decentration distortion and astigmatism are still under-corrected. Optical system disclosed in Japanese Laid-Open Patent Application No. 2-297516 and U.S. Pat. No. 4,761,056 which are systems developed from this are the same in basic construction as that of U.S. Pat. No. 3,923,370 and therefore suffer from a similar problem.

Also in Japanese Laid-Open Patent Application No. 5-303055 and Japanese Laid-Open Patent Application No. 5-303056 introduced above as the systems developed from U.S. Pat. No. 3,923,370, the correction of aberrations created in the decentered system is insufficient. In the former, decentration distortion created in an eyepiece reflecting surface is reduced by the swinging and tilting (shifting and rising-falling) of a relay system, but since the shapes of distortions created in a reflecting eyepiece system and a refracting relay system do not coincide with each other, the distortions cannot be cancelled relative to the entire image field and the vertical and horizontal aspect ratio of an image is neither corrected at all.

With regard to the latter, the shape formed by linking the four corners of an image together is made into a rectangle, but the outline thereof is a rotation-asymmetrical shape and is a curved line, and the aspect ratio is neither corrected. This is a phenomenon arising because there is not included an optical element for correcting decentration distortion created in a decentered eyepiece system, and although distortion can be reduced, it has been impossible to fundamentally solve the problems of the aspect ratio, etc.

SUMMARY OF THE INVENTION

The present invention has as its object to provide an image display apparatus which has the see-through function of observing a displayed image as it is superposed on an exterior and enables as image of light quality which is bright and has little image distortion to be observed.

One form of the image display apparatus of the present invention for achieving the above object is an image display apparatus disposed near an observer's head for observing an image displayed on image display means as an enlarged virtual image, characterized by:

a relay optical system for causing the displayed image by the image display means to be intermediately formed, the relay optical system having at least one decentered reflecting surface for bending a light beam from the image display means, and at least one lens of an anamorphic aspherical shape differing in curvature in any orthogonal direction; and an eyepiece optical system for directing the image by the relay optical system to the observer's pupil, the eyepiece optical system having at least one decentered reflecting surface which is an anamorphic aspherical surface of a concave surface shape for bending the light beam from the relay optical system.

The decentered reflecting surface of the relay optical system is an anamorphic aspherical surface.

The image display apparatus further has a mirror surface disposed in the optical path between the decentered reflecting surface of the eyepiece optical system and the decentered reflecting surface of the relay optical system.

The mirror surface is a convex anamorphic aspherical surface.

When the paraxial radii of curvature in two orthogonal directions at the vertex of the anamorphic aspherical surface which is the concave reflecting surface are defined as Rx and Ry, the image display apparatus satisfies $$0.5 < Rx/Ry < 0.9.$$

When relative to the direction z of the optical axis, the shape of the anamorphic aspherical surface of the eyepiece system is defined as $$z = \frac{R(x)x^2 + R(y)y^2}{1 + \sqrt{1 - (1 + KX)R(x)^2x^2 - (1 + KY)R(y)^2y^2}} +$$

$$AR\{(1 - AP)x^2 + (1 + AP)y^2\}^2 + BR\{(1 - BP)x^2 + (1 - BP)y^2\}^3 +$$

$$CR\{(1 - CP)x^2 + (1 + CP)y^2\}^4 + DR\{(1 - DP)x^2 + (1 + DP)y^2\}^5$$

the aspherical surface coefficient AR is a value of the same sign as the radius of curvature and which is not 0, and when the curvature in two orthogonal directions is defined as Rs, the image display apparatus satisfies $$0 < AR/Rs < e^{-8}$$

In the anamorphic aspherical surface which is the concave reflecting surface, the curvature in a direction perpendicular to the direction in which the light beam is bent by the decentering of the reflecting surface is smaller toward the margin.

The decentered reflecting surface of the eyepiece optical system is a beam splitter.

One form of the image pickup apparatus of the present invention is an image pickup apparatus for forming the image of an object on the surface of an image pickup element, characterized by:

a reflecting system for primarily imaging a light beam from the object, the reflecting system having at least one decentered reflecting surface which is an anamorphic aspherical surface of a concave surface shape for bending the light beam from the object; and a relay optical system for directing the image by the reflecting system onto the surface of the image pickup element, the relay optical system having at least one decentered reflecting surface for bending the light beam from the reflecting system, and at least one lens of an anamorphic aspherical shape differing in curvature in any orthogonal direction.

The decentered reflecting surface of the relay optical system is an anamorphic aspherical surface.

The image pickup apparatus further has a mirror surface disposed in the optical path between the decentered reflecting surface of the reflecting system and the decentered reflecting surface of the relay optical system.

Some specific embodiments of the present invention will become apparent from the following detailed description.

BRIEF DESCRIPTION OF THE DRAWINGS

FIGS. 3A and 3B illustrate decentration distortion correction in the construction of the present invention.

FIGS. 4A and 4B illustrate decentration distortion correction in the construction of the present invention.

DESCRIPTION OF THE PREFERRED EMBODIMENTS

Figure 1:
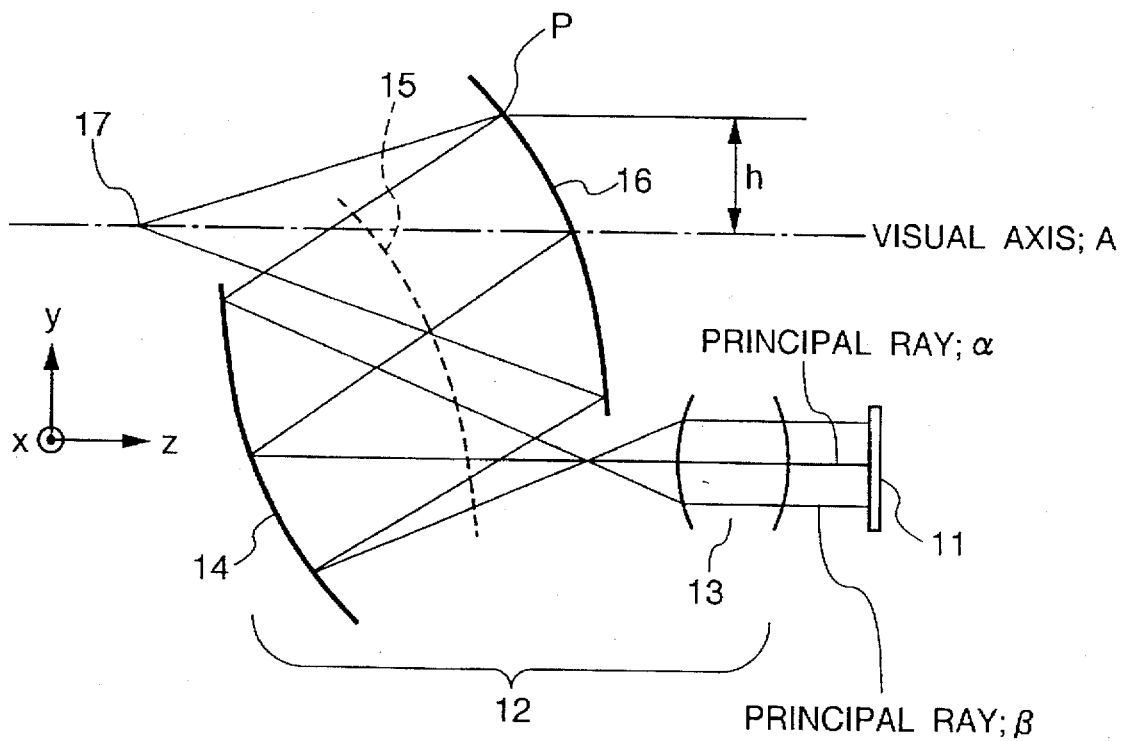
FIG. 1 shows the basic construction of the decentered optical system of the present invention.

FIG. 1 is a schematic view of the image display apparatus of the present invention. In FIG. 11, the reference numeral 11 designates image display means such as a CRT or an LCD, and the reference numeral 12 denotes a relay optical system for intermediately imaging the light beam of an image displayed on the screen of the image display means 11. The relay optical system 12 is comprised of a refracting optical system 13 and a reflecting surface (eyepiece reflecting surface) 14. The reference numeral 15 designates the intermediate image by the relay optical system 12, the reference numeral 16 denotes a reflecting surface (eyepiece reflecting surface), and the reference numeral 17 designates an eye point for positioning an observer's pupil.

The principal ray of the light beam from the center of the screen of the image display means 11 is indicated as $\alpha$, and the principal ray of the most off-axial light beam from the display screen in the plane of the drawing sheet of FIG. 1 is indicated as $\beta$.

The principal ray $\alpha$ reflected by the eyepiece reflecting surface 16 and incident on the eye point 17 coincides with the observer's visual axis A, and the relay optical system 12 and the eyepiece optical system 16 are disposed so as to bend all light beams forming the virtual image of the displayed image. Also, in the coordinates system of FIG. 1, the direction from the eye point on the visual axis A toward the virtual image is defined as z direction, the direction orthogonal thereto in the plane of the drawing sheet of FIG. 1 is defined as y direction, and the direction perpendicular to the plane of the drawing sheet of FIG. 1 is defined as x direction.

In FIG. 1, the image displayed on the image display means 11 forms the intermediate image 15 as an aerial image in the space between the reflecting surface 14 and the reflecting surface 16 by the relay optical system 12 comprised of the reflecting surface 14. The eyepiece reflecting surface 16 directs the light beam from the intermediate image 15 to the eye point 17 and therefore, the observer can observe the image displayed on the image display means 11 as a virtual image at a distance in z direction.

If the eyepiece reflecting surface 16 is a beam splitter having both of the reflecting and transmitting functions, the light beam from an exterior can be transmitted through the reflecting surface 16 and directed to the eye point 17 and therefore, there can be provided the so-called see-through function whereby the displayed image on the image display means 11 is superposed on the exterior.

The present invention is characterized in that the eyepiece reflecting surface 16 is inclined with respect to the observer's visual axis A. Comparing the case where the reflecting surface 16 is inclined with the disposition of a coaxial system, it will be seen that the distance h in y direction between the reflection points of the principal rays $\alpha$ and $\beta$ on the reflecting surface 16 can be shortened.

Considering that two of the optical system shown in FIG. 1 are disposed symmetrically in y direction for right and left eye viewing, physical interference between the right and left optical systems will occur unless h is a half or less of the distance (base length) between the pupils of the observer's both eyes. From the fact that the maximum value of h is a value determined by the observer's base length, to make the angle of field great, the position of the reflection point P of the most off-axial light beam $\alpha$ of FIG. 1 on the eyepiece reflecting surface 16 can be moved as much as possible in the minus direction of z axis. Therefore, if the eyepiece reflecting surface 16 is made into a decentered system inclined with respect to the visual axis A, the coordinates value of the reflection point P on z axis can be made approximate to the eye point 17.

The eyepiece reflecting surface 16 is not minute decentering caused by the manufacturing error, assembling error, etc. of the coaxial optical system. The decentered eyepiece reflecting surface 16 is a mirror surface and therefore does not create chromatic aberration, but yet creates other various decentration aberrations. Decentration aberrations are created in a form rotation-asymmetrical with respect to the center of the image field and therefore, to correct these, it is very effective to cancel the decentration aberration created in a decentered element by another decentered element.

Consequently, the present invention is characterized in that the decentration aberration created in the eyepiece system is corrected by making a portion of the relay system decentered.

The eyepiece reflecting surface 16 is a mirror surface and therefore, if the decentration aberration created in the reflecting surface 16 is corrected by the decentering of a refracting system alone, chromatic aberration as a rotation-asymmetrical component created from the refracting system will remain.

In the present invention, a reflecting surface is introduced into a portion of the relay system, whereby the asymmetrical component of decentration aberration is corrected, and in the construction of FIG. 1, the reflecting surface 14 inclined with respect to the principal ray $\alpha$ of the central angle of view corresponds thereto. However, if the angle of view of the optical system is made great with both of the reflecting surface 14 and the reflecting surface 16 as spherical surfaces, it will be difficult to effect splendid aberration correction over the whole image field. Particularly to correct decentration distortion, the two surfaces must basically be made into an aspherical shape.

In the image display apparatus of the present invention, an anamorphic aspherical surface is introduced into the reflecting surface whereby it is possible to well correct particularly decentration aberration by which the image is distorted into a trapezoidal shape.

Figure 2:
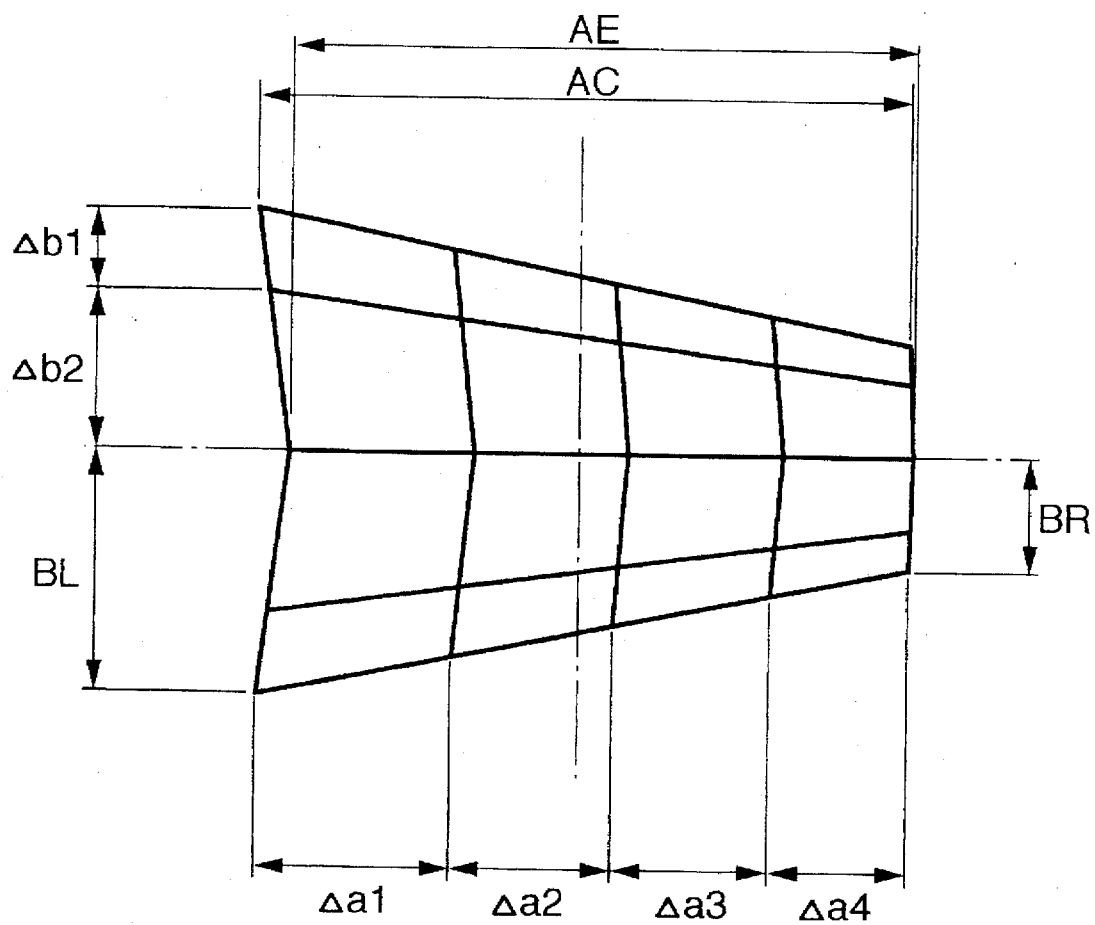
FIG. 2 shows the shape of an image distorted by decentration distortion.
Figure 5:
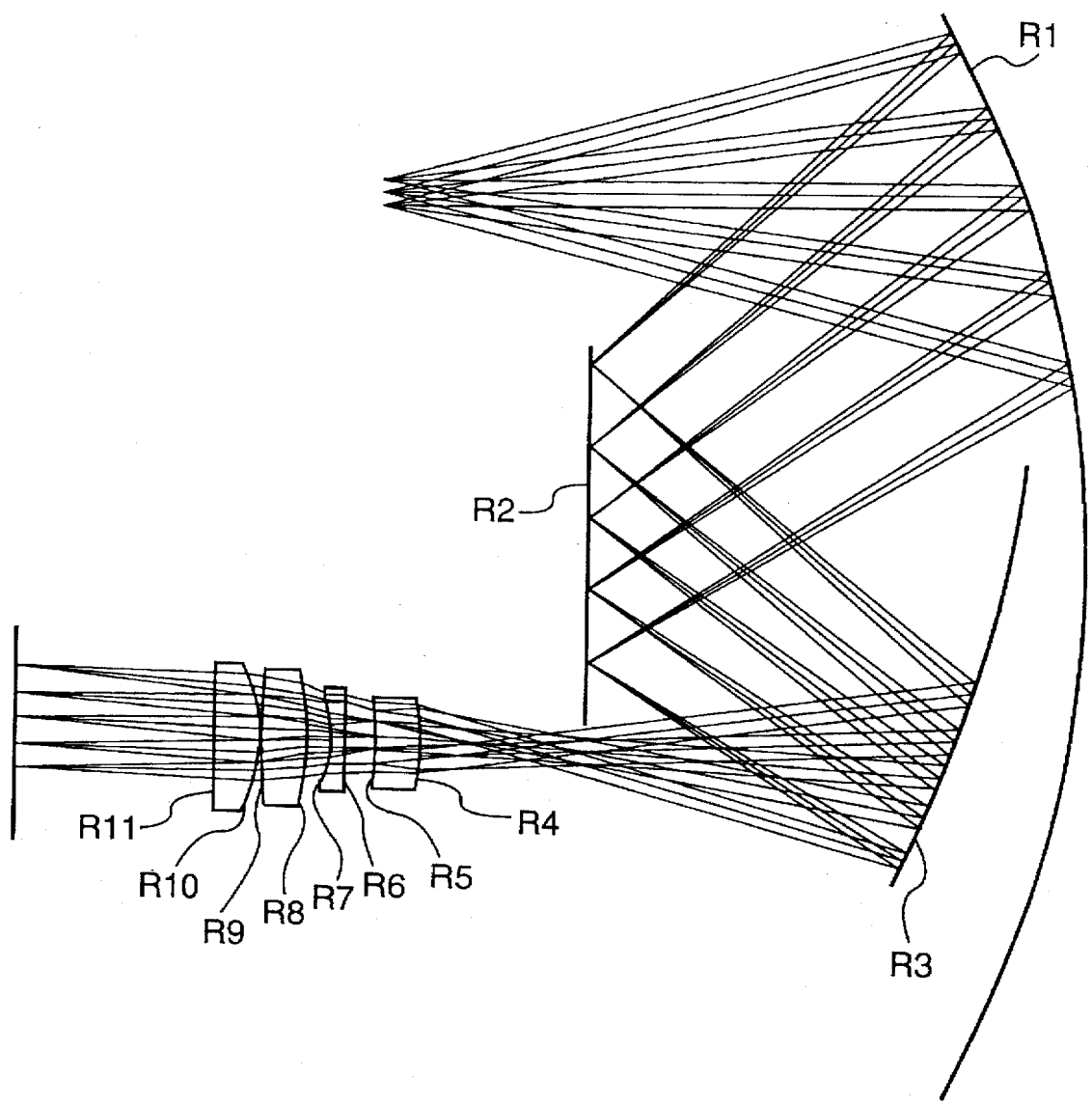
FIG. 5 shows the optical path of the optical system of Numerical Value Embodiment 1.
Figure 6:
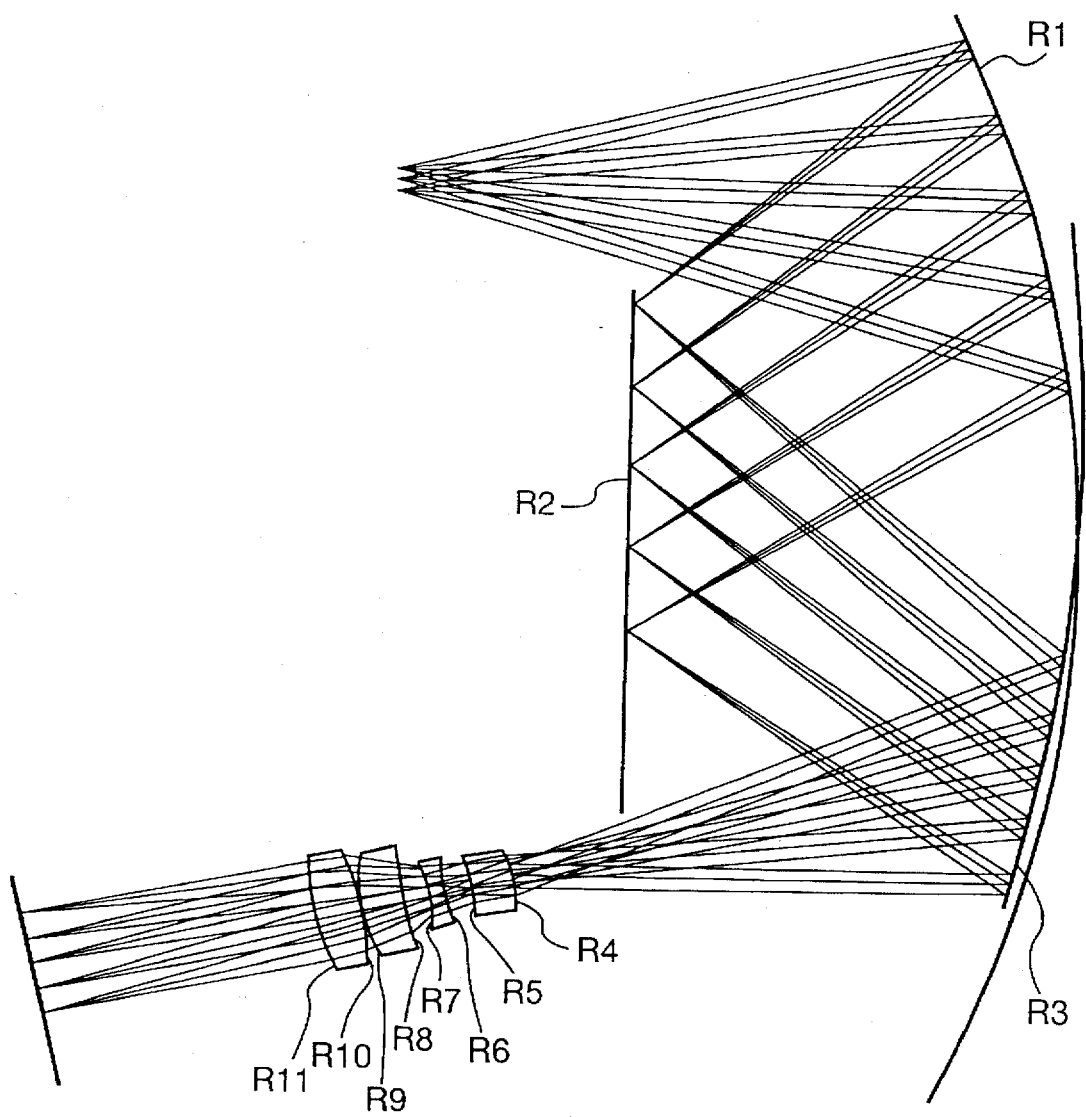
FIG. 6 shows the optical path of the optical system of Numerical Value Embodiment 2.
Figure 7:
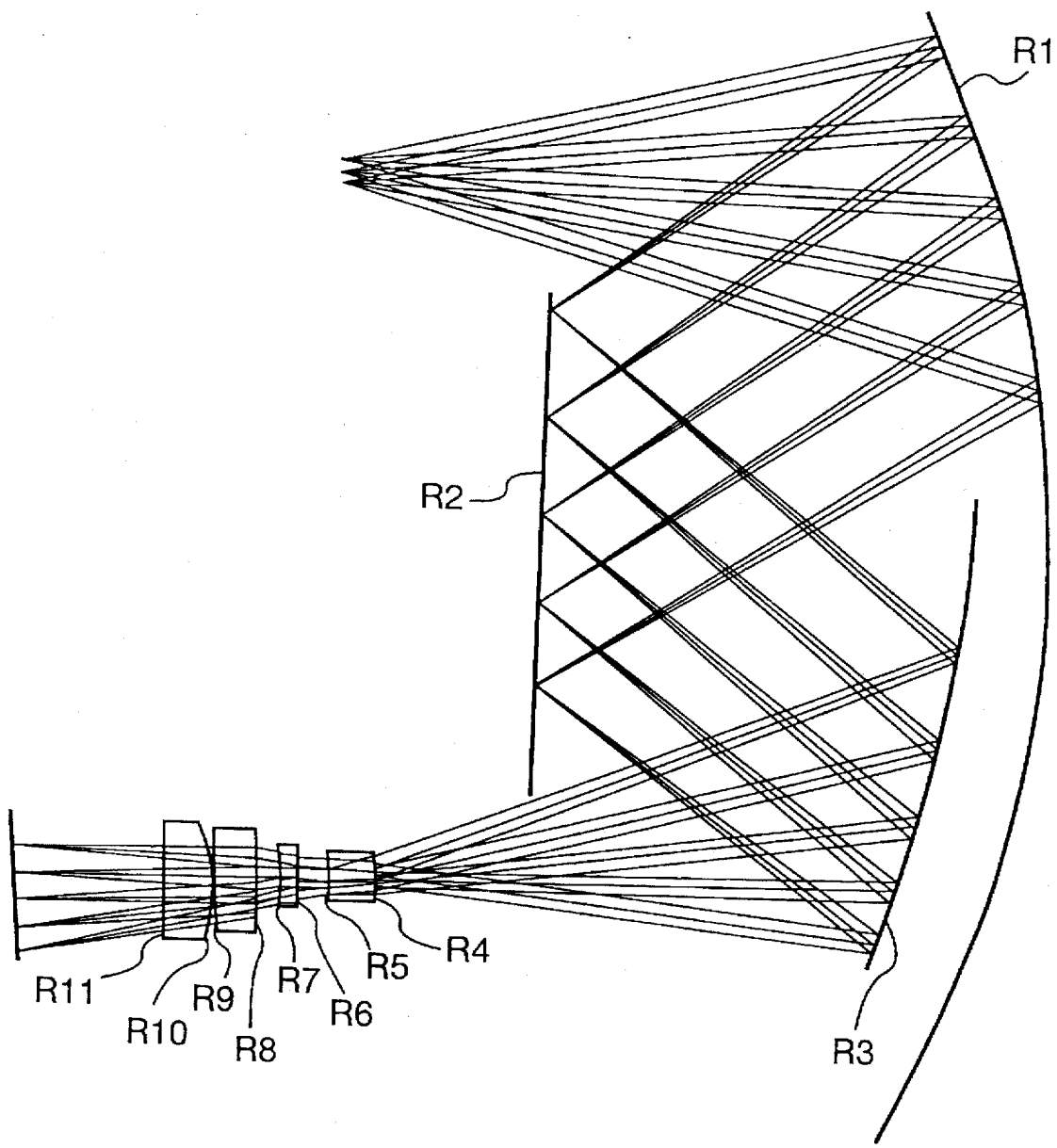
FIG. 7 shows the optical path of the optical system of Numerical Value Embodiment 3.
Figure 8:
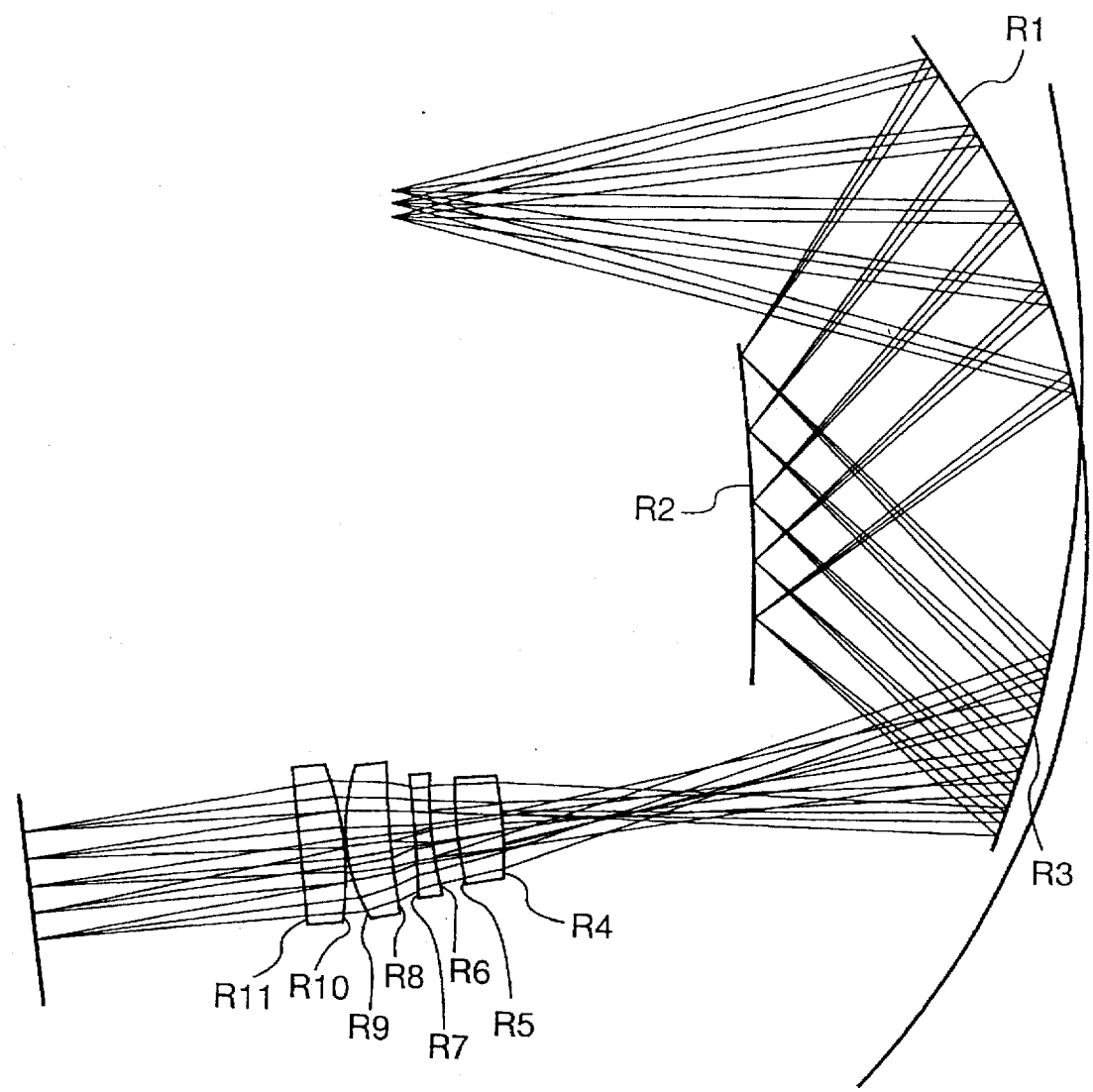
FIG. 8 shows the optical path of the optical system of Numerical Value Embodiment 4.
Figure 9:
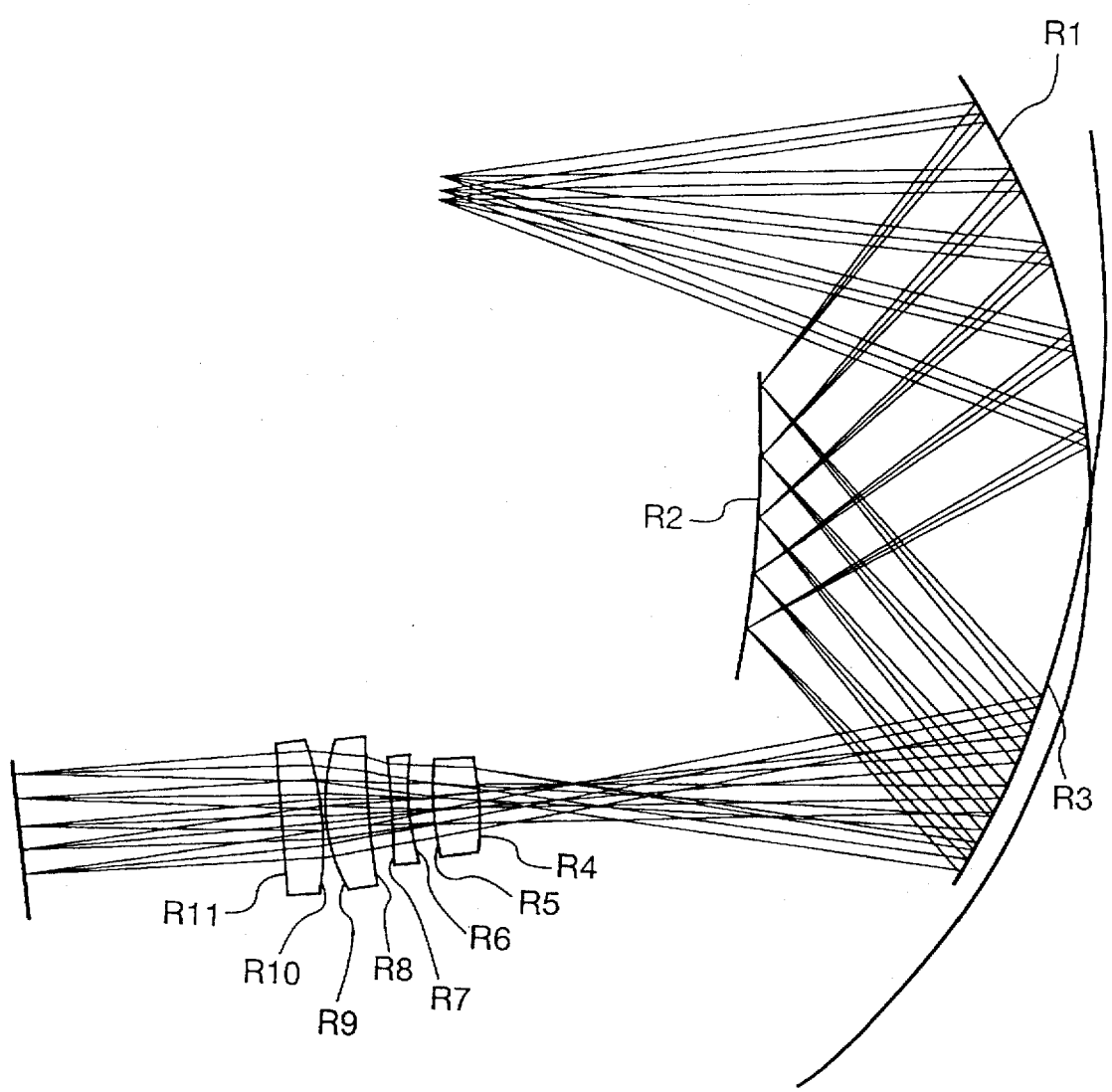
FIG. 9 shows the optical path of the optical system of Numerical Value Embodiment 5.
Figure 10C:
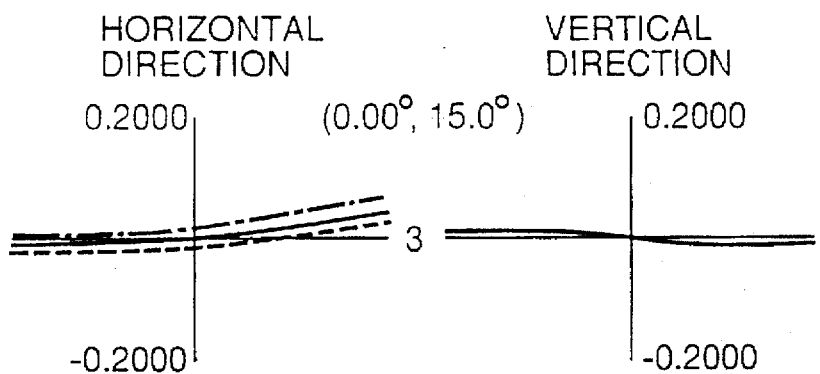
FIGS. 10A through 10F shows the lateral aberration in the optical system of Numerical Value Embodiment 1.
Figure 10B:
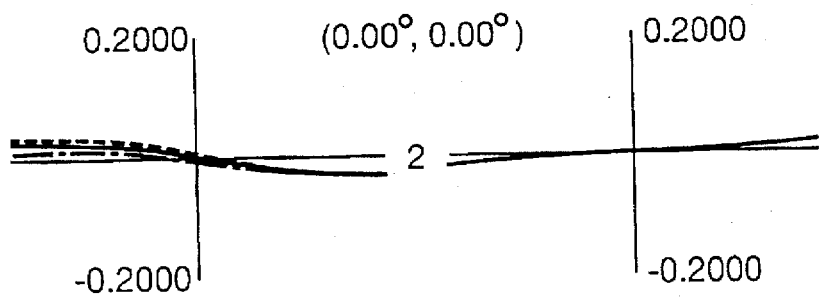
Figure 10A:
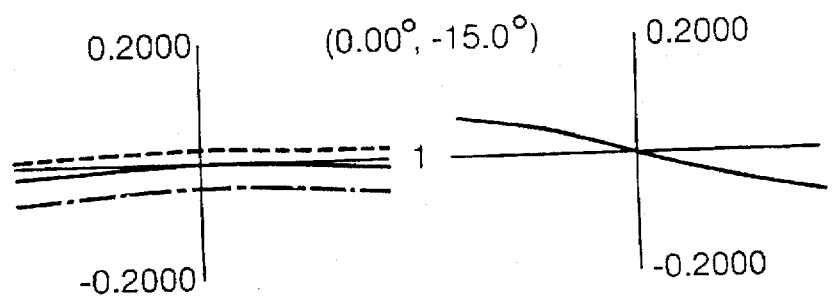
Figure 10F:
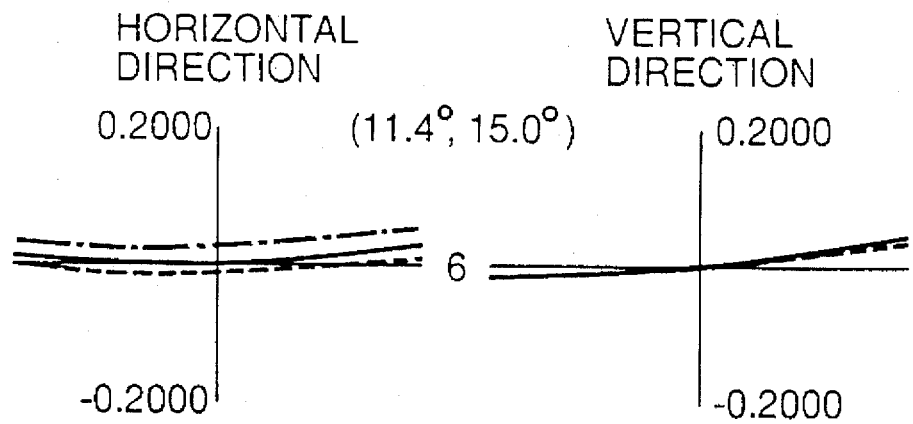
Figure 10E:
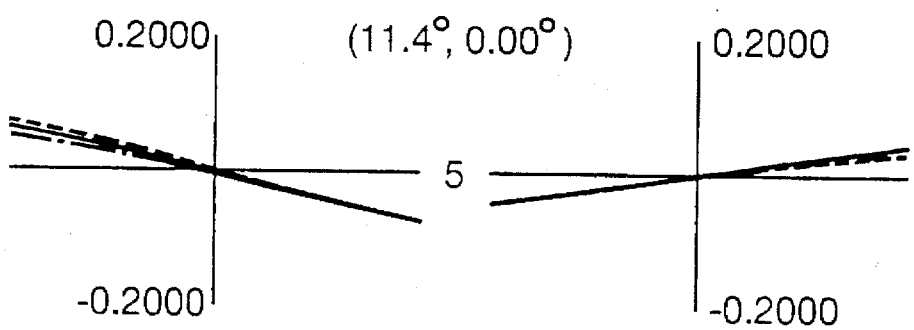
Figure 10D:
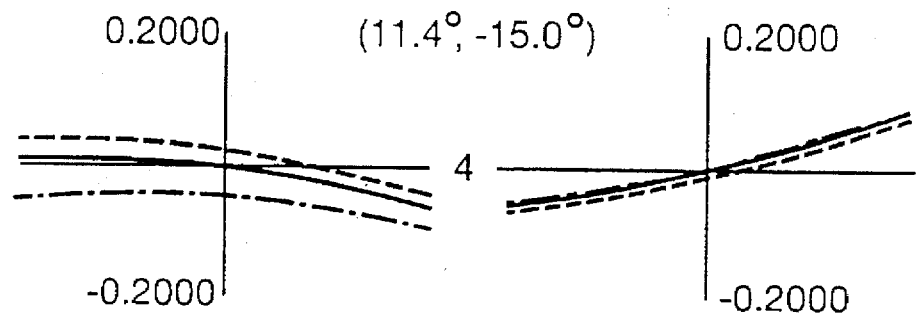
Figure 11C:
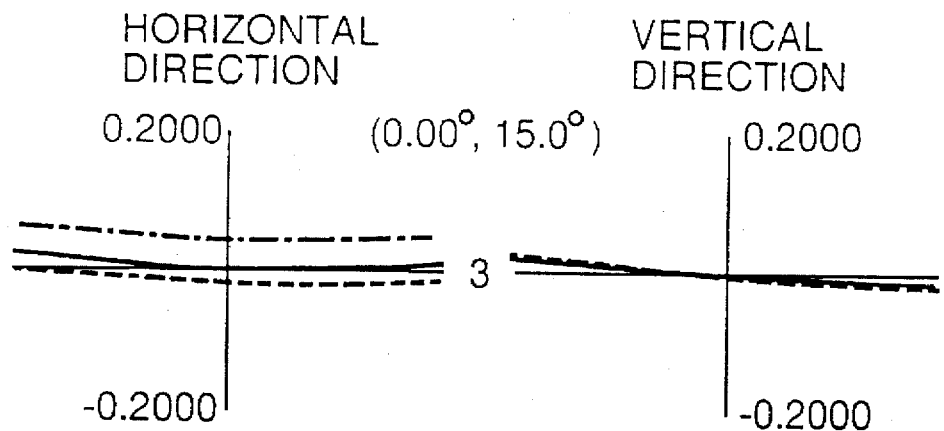
FIGS. 11A through 11F shows the lateral aberration in the optical system of Numerical Value Embodiment 2.
Figure 11B:
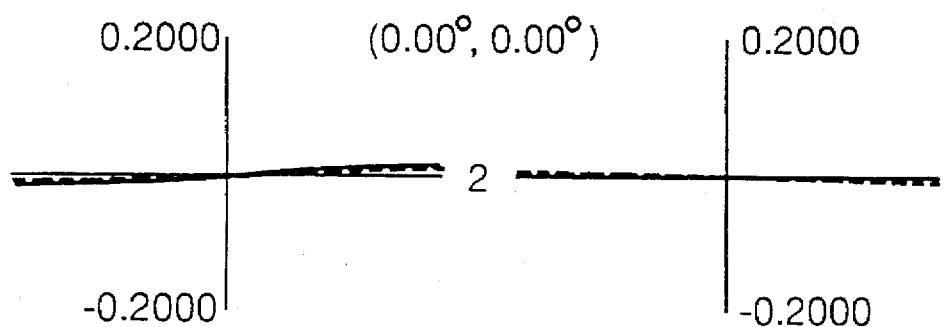
Figure 11A:
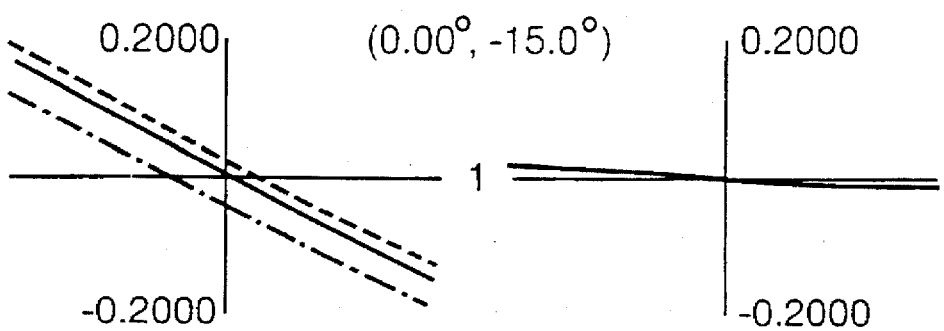
Figure 11F:
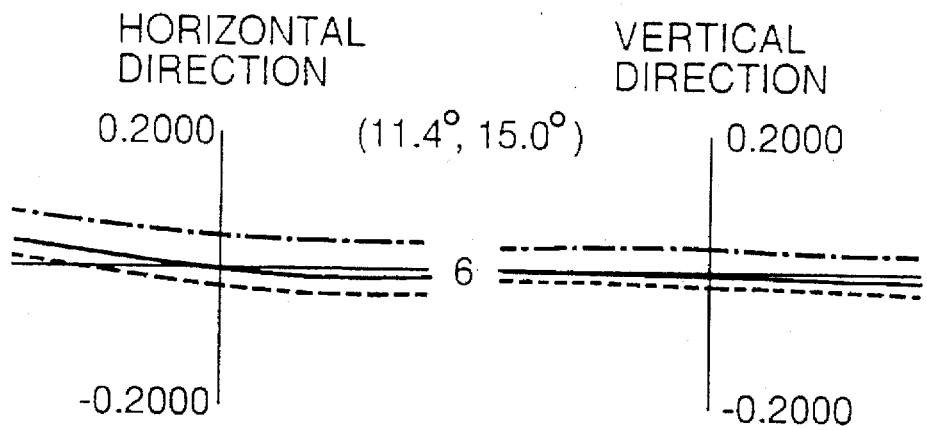
Figure 11E:
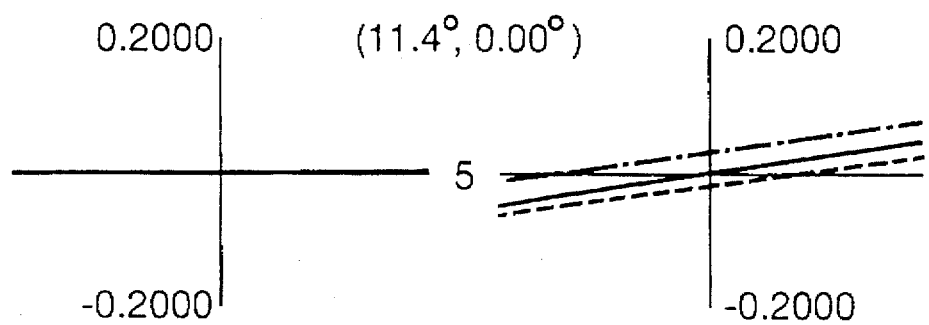
Figure 11D:
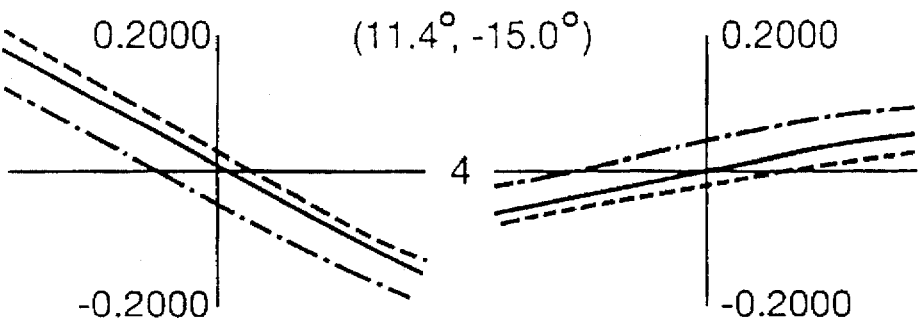
Figure 12C:
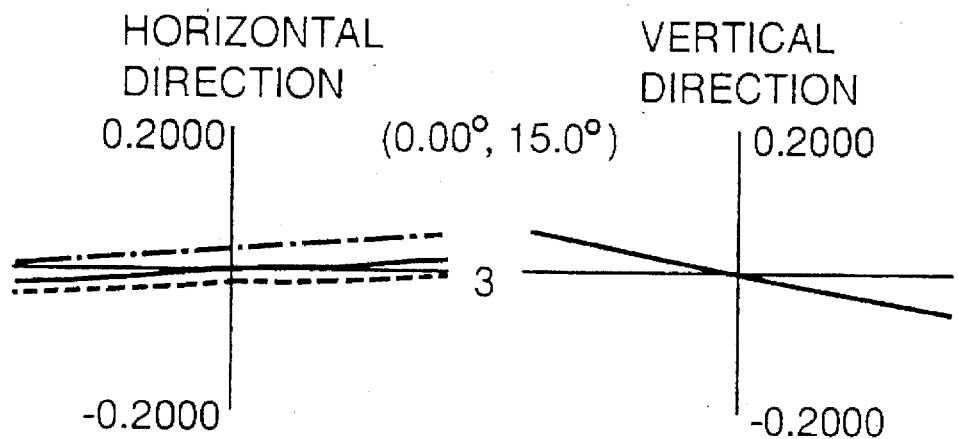
FIGS. 12A through 12F shows the lateral aberration in the optical system of Numerical Value Embodiment 3.
Figure 12B:
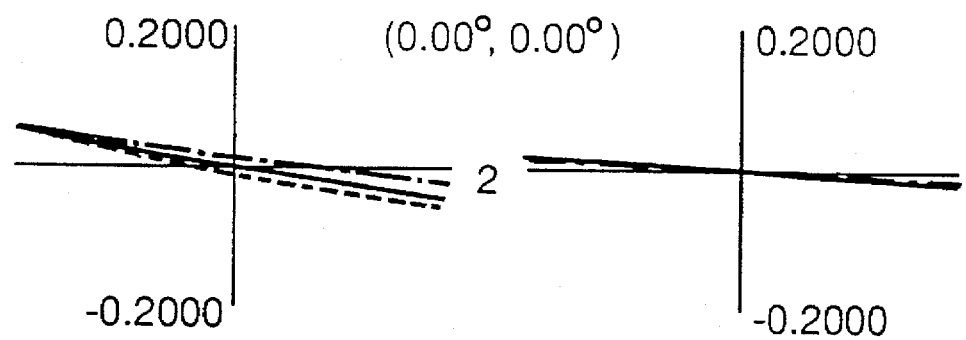
Figure 12A:
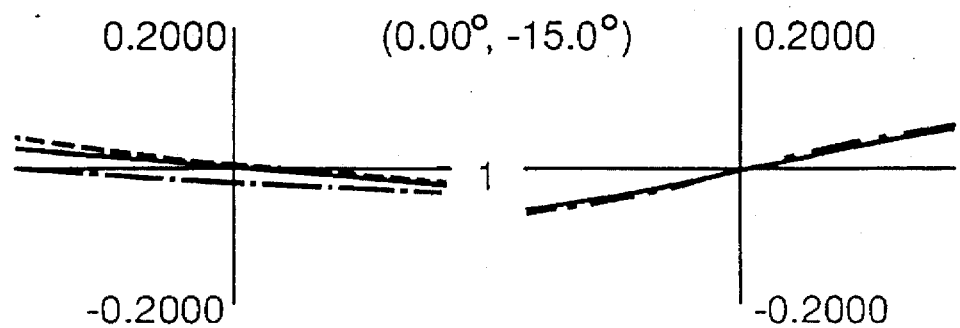
Figure 12F:
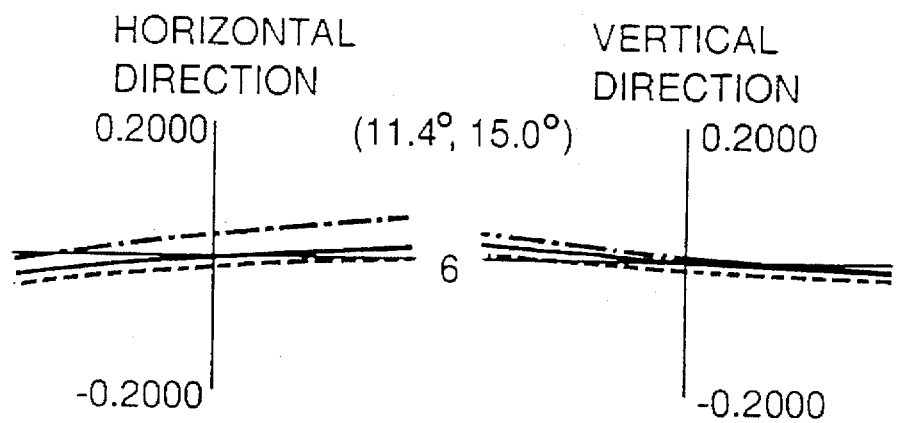
Figure 12E:
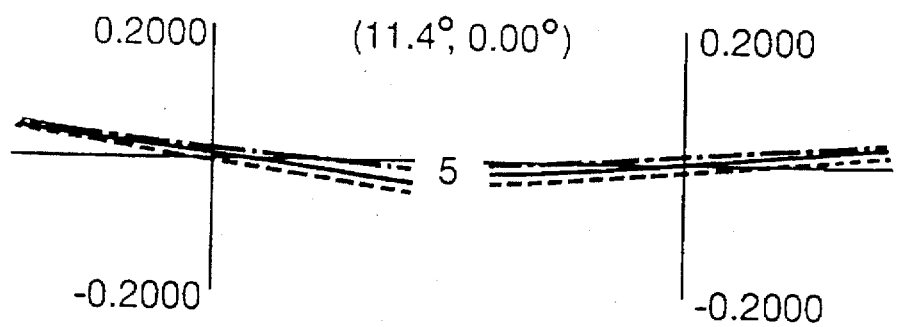
Figure 12D:
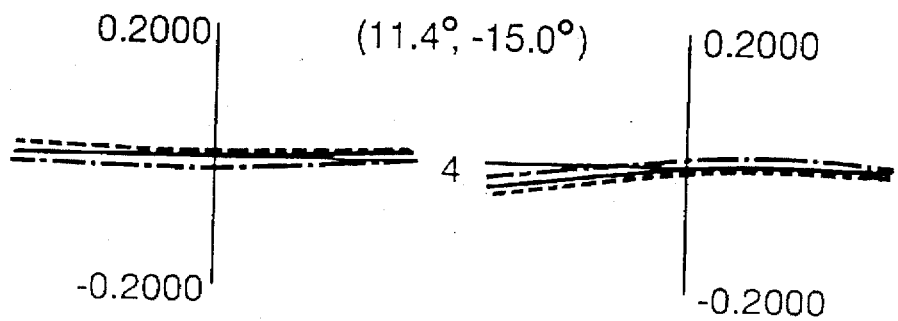
Figure 13C:
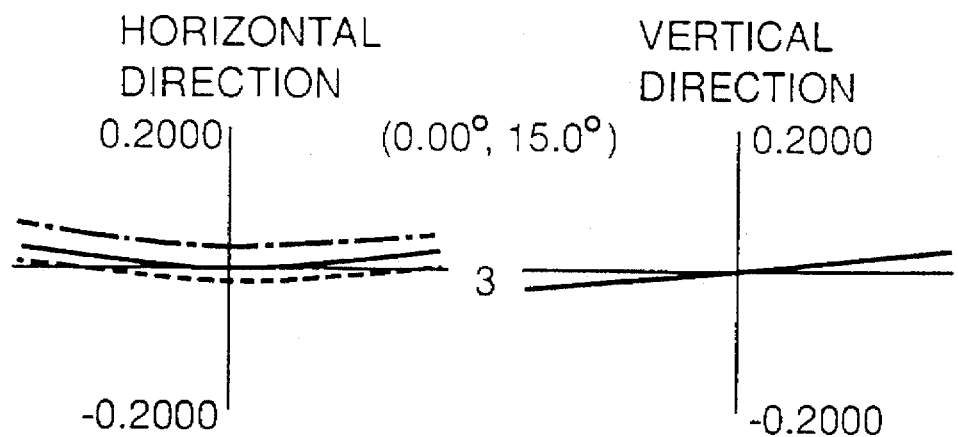
FIGS. 13A through 13F shows the lateral aberration in the optical system of Numerical Value Embodiment 4.
Figure 13B:
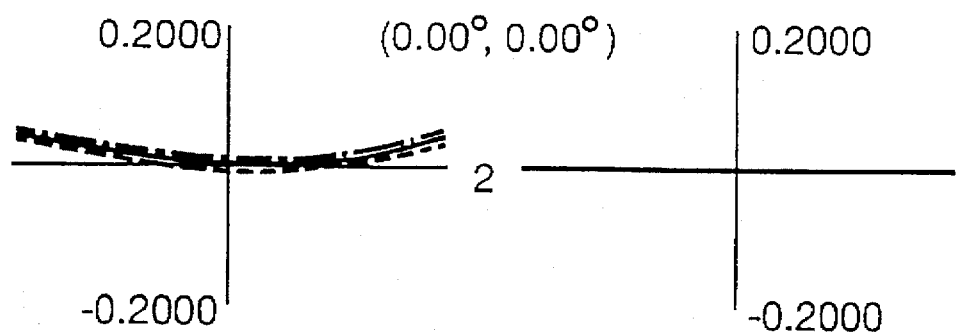
Figure 13A:
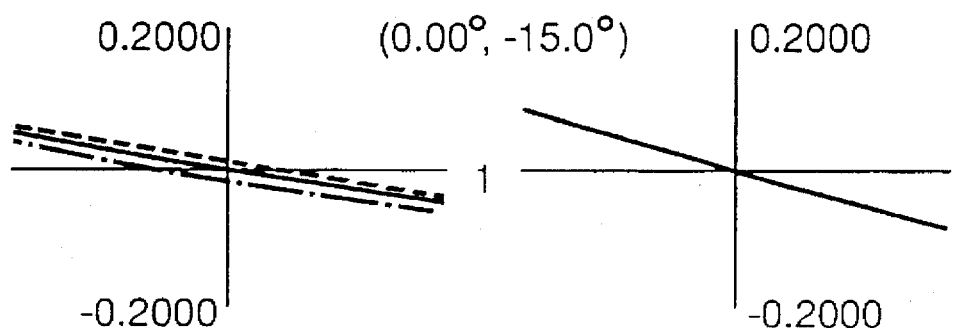
Figure 13F:
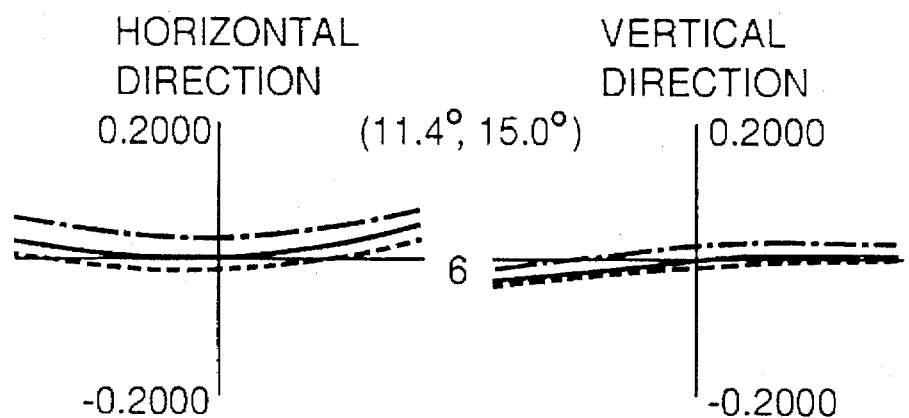
Figure 13E:
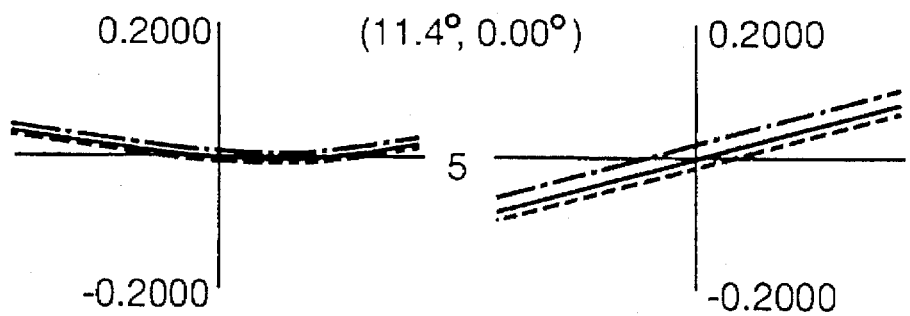
Figure 13D:
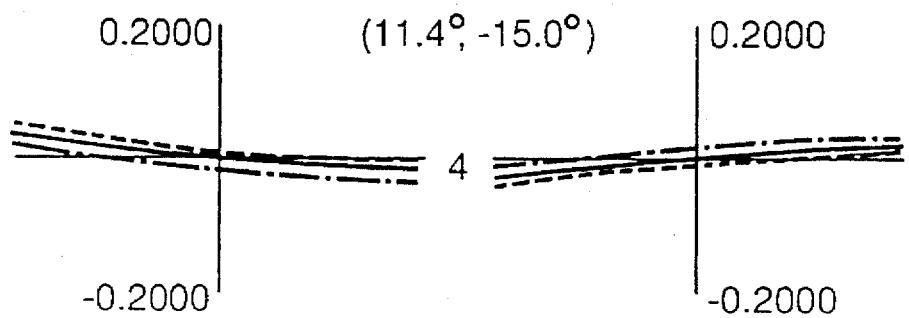
Figure 14C:
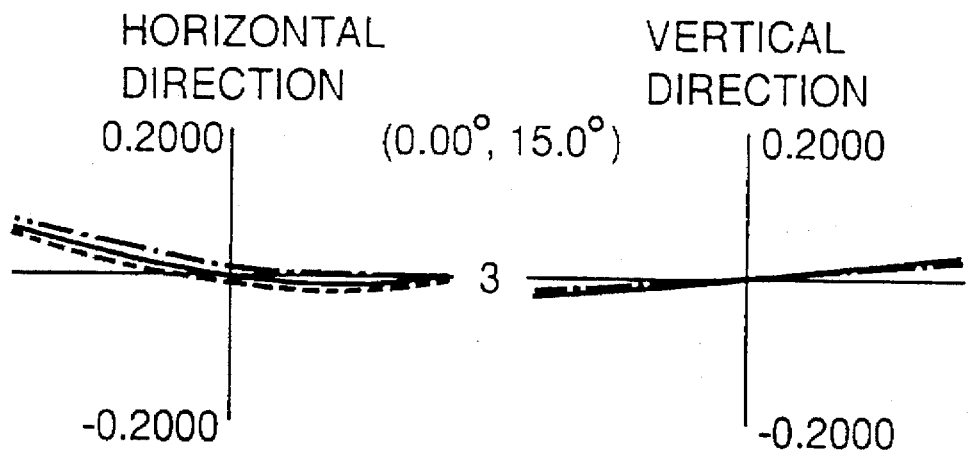
FIGS. 14A through 14F shows the lateral aberration in the optical system of Numerical Value Embodiment 5.
Figure 14B:
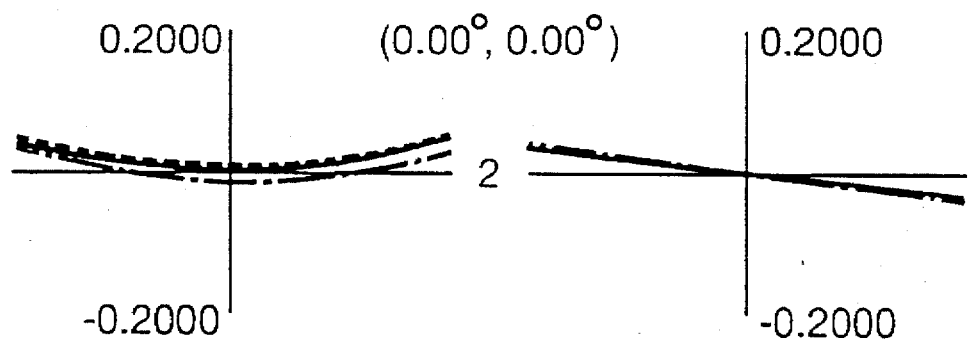
Figure 14A:
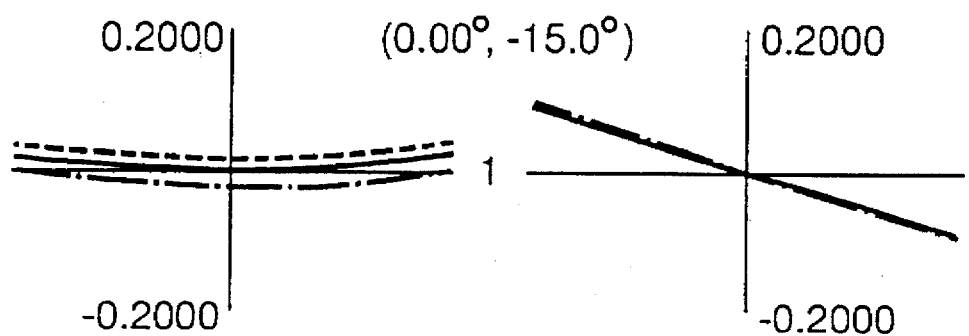
Figure 14F:
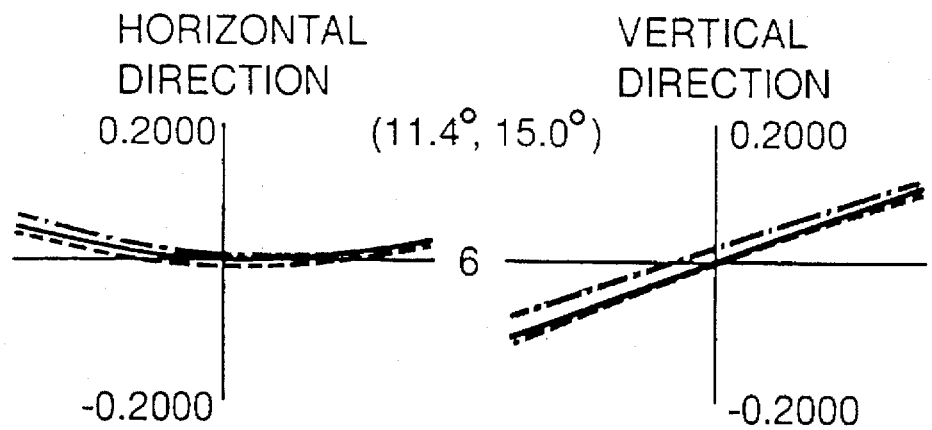
Figure 14E:
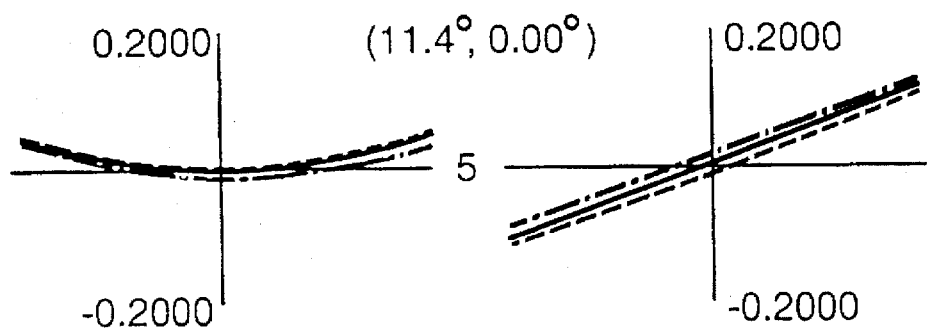
Figure 14D:
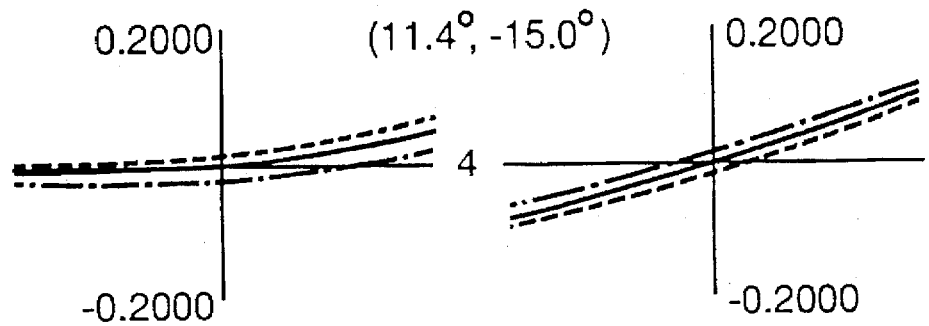
Figure 15:
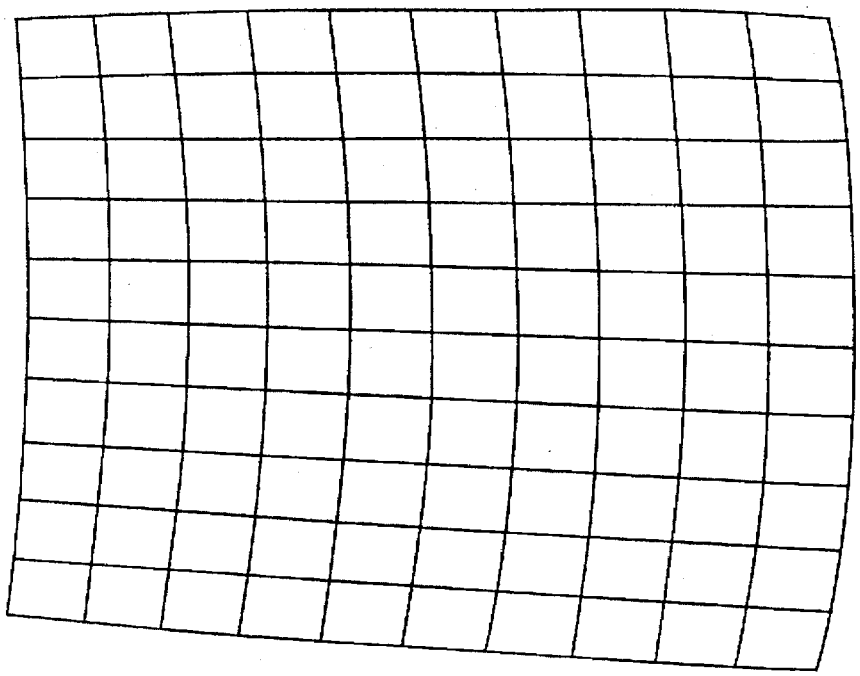
FIG. 15 shows the image shape by the optical system of Numerical Value Embodiment 1.
Figure 16:
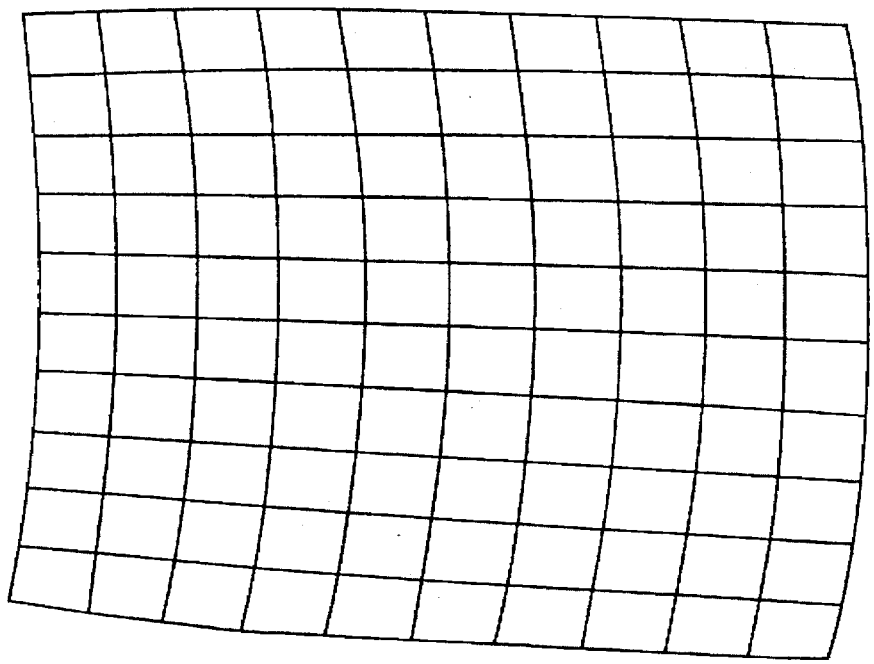
FIG. 16 shows the image shape by the optical system of Numerical Value Embodiment 2.
Figure 17:
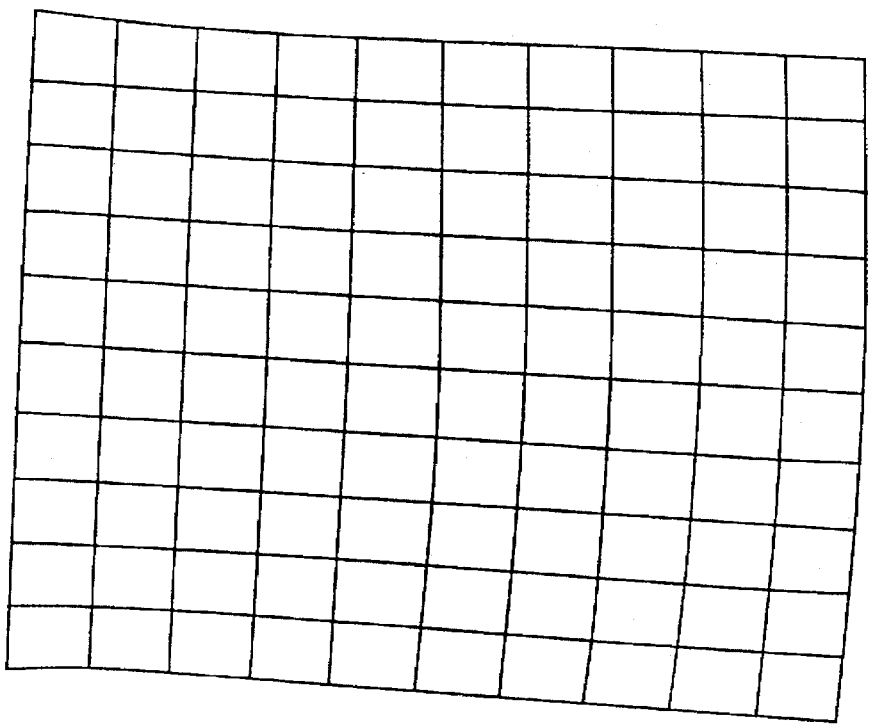
FIG. 17 shows the image shape by the optical system of Numerical Value Embodiment 3.
Figure 18:
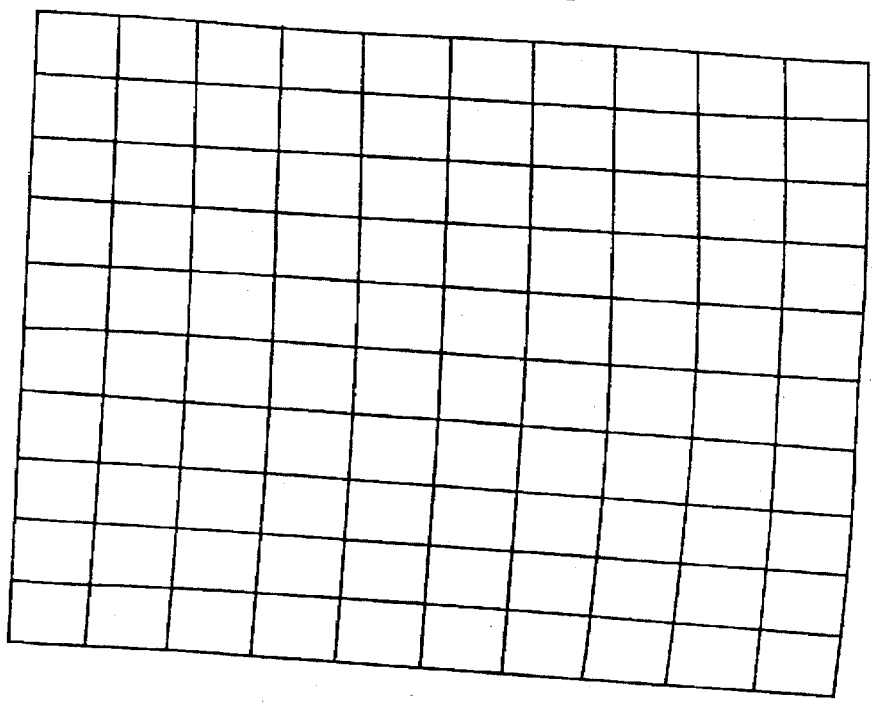
FIG. 18 shows the image shape by the optical system of Numerical Value Embodiment 4.
Figure 19:
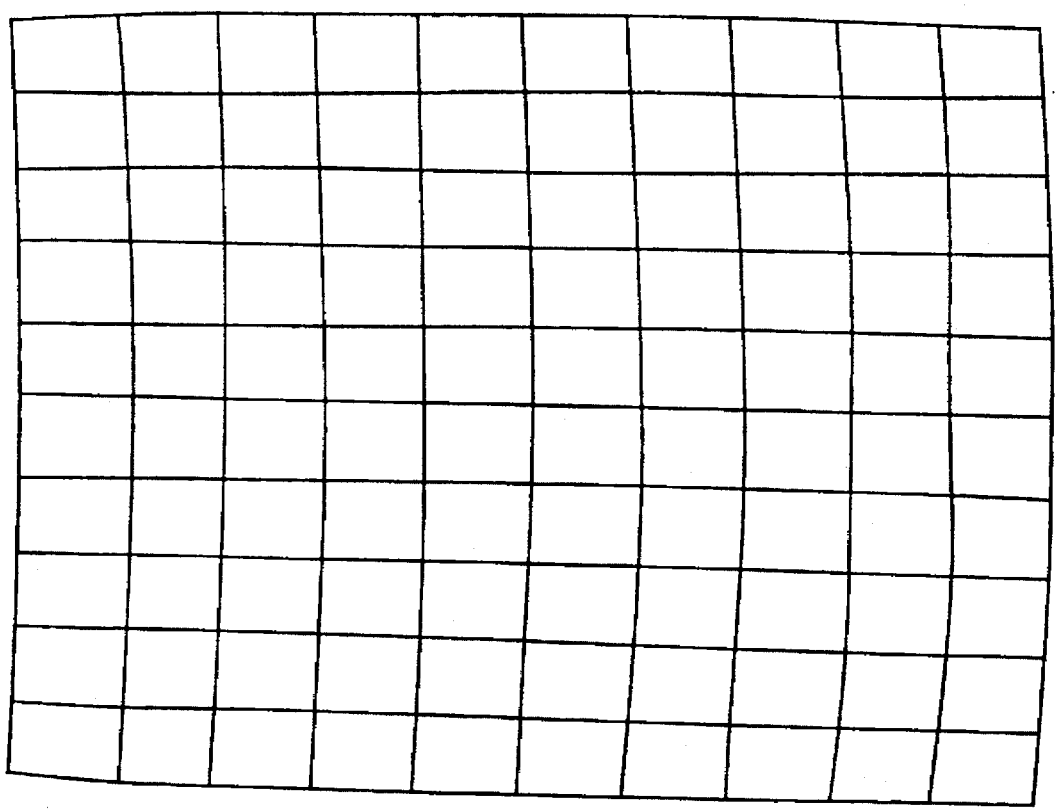
FIG. 19 shows the image shape by the optical system of Numerical Value Embodiment 5.

FIG. 2 shows an image shape distorted by decentration distortion. The correction of decentration distortion by which the image is distorted into a trapezoidal shape is divided into three elements:

(1) the shape becoming rectangular, (2) the strain correction of compression and expansion in vertical and horizontal directions; and (3) the correction of the aspect ratio.

Here, the conditions of correction are as follows in FIG. 2:

| (1) The shape becoming rectangular | BL = BR, AC = AE |
|---|---|
| (2) The strain correction of compression and expansion in vertical and horizontal directions | $\Delta a1 = \Delta a2 = \Delta a3 = \Delta a4$<br>$\Delta b1 = \Delta b2$ |
| (3) The correction of the aspect ratio | AC/2BL ($\approx$AE/2BR)<br>= the set aspect ratio on the virtual image surface |

The aspect ratio on the virtual image surface in item (3) above need not always be the same as the aspect ratio of the displayed image on the image display means. If for example, a displayed image of an aspect ratio 4:3 is aspect-ratio-converted as a virtual image of 16:9 by an optical system, a wide image can be observed without the size of the image display means being changed. Such aspect ratio conversion is determined by the characteristic of the optical system and is therefore preset as an aspect ratio correction value in decentration aberration correction.

FIGS. 3A and 3B illustrates the principle of decentration distortion correction. For the sake of convenience, y direction is called the horizontal direction and x direction is called the vertical direction. The construction of the optical system is 10 the same as that in FIG. 1, and FIG. 3A shows a horizontal cross-section and FIG. 3B shows a vertical cross-section in which FIG. 3A is projected in y direction. In FIG. 3A, R1, R2 and R3 designate the principal rays of light beams equal in the angle of view in the vertical direction and differing in the angle of view in the horizontal direction, and P1–P6 denote the reflection points of the respective rays on the reflecting surface 14 and the reflecting surface 16. The action of the system will hereinafter be described with respect to the so-called converse trace in which a light beam is made to enter with the eye point 17 as the entrance pupil and is imaged on the image display surface.

First, consider the rays R1–R3 incident on the eyepiece reflecting surface 16 from the eye point 17 with the same vertical angle of view $\beta 1$. If the rays R1–R3 overlap one another as a result of having finally been reflected at the reflection points P4–P6 on the reflecting surface 14 in the cross-section of FIG. 3B, they enter the refracting system 13 with their heights in the vertical direction made uniform, and the condition of item (1) for the shape becoming rectangular that BL=BR in FIG. 2 is satisfied.

Here, the point Psx at which the rays reflected at the points P4–P6 intersect the optical axis of the refracting system indicated by a dot-and-dash line is the position of the entrance pupil of the refracting optical system 13 in the vertical cross-section. Consequently, the curvature, in the vertical direction, of the relay reflecting surface 14 effecting reflection at the points P4–P6 is primarily determined by the angles of the rays entering from the points P1–P3 and the position of the point Psx.

Next, consider the behavior of the rays R1–R3 in the horizontal cross-section (FIG. 3A). If the rays R1–R3 incident on the eyepiece reflecting surface 16 at an angle of incidence $\alpha 1=\alpha 2$ satisfies $\theta 1=\theta 2$ when they are finally reflected at the points P4–P6 on the relay reflecting surface 14 and thereafter are incident on a point Psy which is the pupil position in the horizontal direction, the intervals therebetween in the horizontal direction will become uniform. This condition corresponds to $\Delta a1=\Delta a2=\Delta a3=\Delta a4$ of item (2) above. Consequently, the curvature, in the horizontal direction, of the relay reflecting surface 14 effecting reflection at the points P4–P6 is primarily determined by the angles of the rays entering from the points P1–P3 and the position of the point Psy.

From the foregoing consideration, the curvatures, in the vertical and horizontal directions, of the reflecting surface 14 having the points P4–P6 as the reflection points are determined by the incidence condition of the light coming from the reflecting surface 16 and the pupil position of the relay system. Consequently, the reflecting surface 14 becomes an anamorphic aspherical surface differing in curvature between the horizontal direction and the vertical direction. Also, when the refracting system 13 is as spherical system, Psx and Psy are the same positions.

To correct the vertical and horizontal aspect ratios of item (3) which is the remaining one condition of decentration distortion correction, it is necessary in FIGS. 3A and 3B to make the tangent of the angle of incidence $\theta 1$(or $\theta 2$) onto the refracting system 13 and $\phi 1$ correspond to the aspect ratio of the image displayed by the image display means 11. In the description hitherto, the rays are conversely traced and therefore, the angle of emergence on the image display surface corresponds to the angle of incidence onto the display screen. The positions Psx and Psy are determined by the angles of incidence onto the refracting system 13 and the display screen which is the imaging plane and therefore, to correct the aspect ratio, it is necessary to control the angle of incidence onto the reflecting surface 14 in one of the vertical and horizontal cross-sections.

When for example, $\phi 1$ in the vertical cross-section is to be corrected relative to $\theta 1$ and $\theta 2$ in the horizontal cross-section, it is necessary to correct the heights of the reflection points P4–P6 on the reflecting surface 14 in the vertical direction. For this purpose, the curvatures of the reflection points P1–P3 on the eyepiece reflecting surface 16 in the vertical cross-section must be appropriately set. Therefore, the curvature of the reflecting surface 16 in the vertical direction is primarily determined depending on the incidence angle of view $\beta 1$ from the entrance pupil 17 onto the reflecting surface 16, the curvature of the reflecting surface 14 and $\phi 1$.

The curvature of the reflecting surface 16 in the horizontal direction is also determined by the conditions of decentration distortion correction. FIGS. 4A and 4B are illustrations of it. The coordinates system is the same as that of FIGS. 3A and 3B, and FIG. 4A shows a horizontal cross-section and FIG. 4B shows a vertical cross-section. The rays R4–R6 now are the principal rays of light beams incident from the eye point 17 onto the eyepiece reflecting surface 16 at a horizontal angle of view $\alpha 3$. When seen in the vertical cross-section, in contrast with the ray R6 emerging straightly forwardly from the entrance pupil, the ray R5 has an angle $\beta 2$ and the ray R4 has an angle $\beta 3$, and the tangent of $\beta 3$ is double the tangent of $\beta 2$.

Points Pa–Pf indicate the reflection points of the rays R4–R6, respectively, on the reflecting surface 16 and the reflecting surface 14. The refracting system 13 continues to the optical system of FIGS. 4A and 4B, as in FIGS. 3A and 3B, but considering in the vertical cross-section, the projection of the ray R4 onto the vertical cross-section coincides with the optical axis of the refracting system 13.

Accordingly, if the double of the tangent of an angle φ2 the ray R5 forms with the optical axis in the vertical cross-section becomes substantially equal to the tangent of an angle φ3 the ray R4 forms with the optical axis in the vertical cross-section, Δb1=Δb2 of item (2) above is established, and the distortion in the vertical direction can be corrected and the intervals can be made uniform. To satisfy such a condition, the curvature of the reflecting surface 16 in the vertical direction can be set in conformity with the positions of the points Pa–Pc correspondingly to the shape of the reflecting surface 14, or the curvature of the reflecting surface 14 in the vertical direction can be set in conformity with the positions of the points Pd–Pf correspondingly to the shape of the reflecting surface 16.

On the other hand, considering the horizontal cross-section (FIG. 4A), if the rays R4–R6 are reflected at the points Pd–Pf on the reflecting surface 14 and thereafter are incident on the position Psy in coincidence with one another, the horizontal positions of the rays differing in the vertical angle of view will coincide with one another. That is, speaking in FIG. 2, the horizontal positions of end points AE and AC can be made coincident with each other and therefore, AE=AC can be brought about after all. To do so, the curvature of the reflecting surface 16 in the horizontal direction can be set in conformity with the positions of the points Pa–Pc correspondingly to the shape of the reflecting surface 14, or the curvature of the reflecting surface 14 in the horizontal direction can be set in conformity with the positions of the points Pd–Pf correspondingly to the shape of the reflecting surface 16. However, the shape of the reflecting surface 14 is determined by the substance of the correction shown in FIGS. 3A and 3B and therefore, this time, the curvature of the reflecting surface 16 in the horizontal direction can be set.

As shown in FIGS. 3A, 3B, 4A and 4B, the principal rays of the observed image are conversely traced, whereby the reflecting surface 16 has its curvatures in the vertical and horizontal directions determined. As regards the whole of the reflecting surface 16, it can be made into an anamorphic aspherical surface comprising its horizontal and vertical cross-sectional shapes continuously linked together.

From the foregoing, decentration distortion becomes correctable by the construction in which anamorphic aspherical surfaces are introduced into both of the reflecting surface 14 and the reflecting surface 16 and the refracting system 13 and the image display surface are made into a coaxial system. The correction of decentration distortion, particularly in an optical system for displaying the same images or a stereoscopic image for both-eye viewing, is very important from the viewpoint of image fusion or the like, and it is necessary to make the difference in distortion between the corresponding image portions of right and left images as small as possible.

Various modifications of the principle of decentration distortion correction shown above are conceivable. If for example, an anamorphic aspherical surface is introduced into the refracting system 13, the aforedescribed shape determining conditions for the reflecting surface 14 and the reflecting surface 16 will be alleviated. This is because by the effect of the anamorphic aspherical surface in the refracting system 13, it becomes unnecessary to make the pupil positions Psx and Psy of the relay optical system coincident with each other, and it means that astigmatism correction need not be made with respect to the pupil imaging between the eye point 17 and the pupil of the relay optical system. The correction as the whole system can be made by the adjustment of the power of the succeeding anamorphic surface.

If this is done, the degree of freedom will heighten regarding the determination of the shapes of the reflecting surface 14 and the reflecting surface 16 and therefore, it is possible to make the other aberrations jam distortion less, or set one of the reflecting surface 14 and the reflecting surface 16 to a rotation-symmetrical shape. In the former case, there is the fact that the performance of the entire optical system is improved, and in the latter case, there is a merit in the cost of manufacture of the optical elements. In the latter case, when the reflecting surfaces are to be made by resin molding, a metal mold can be made for a reflecting surface of a large outer diameter by rotation working, and this leads to the effect that this reflecting surface can be made inexpensively.

In an embodiment of the optical system to which the present invention is applied, if a convex reflecting surface is disposed between the concave reflecting surface 14 and reflecting surface 16 of FIG. 1, the capability of correcting distortion will be improved. There is the primary imaging plane of the displayed image between the reflecting surface 14 and the reflecting surface 16, but if this is done, the convex reflecting surface will play the role of a field mirror and without making it contribute much to the imaging action for the displayed image, the direction of reflection of the rays can be controlled. That is, the convex reflecting surface disposed as described above becomes a reflecting surface especially sensitive to distortion correction and therefore, it becomes possible to correct distortion without very much affecting the other aberrations. Also, it is preferable that the convex reflecting surface be an anamorphic aspherical surface.

When the curvature in the plane in which the fiducial axis ray at the vertex of the anamorphic aspherical surface which is the concave reflecting surface is bent is defined as Ry and the curvature in a plane orthogonal thereto is defined as Rx, it is preferable to satisfy $$0.5 < Rx/Ry < 0.9. \quad (1)$$

Expression (1) above is a conditional expression which prescribes the anamorphic aspherical shape of the concave reflecting surface. Generally, in a spherical reflecting surface, astigmatism is created in a light beam incident obliquely with respect to the axis of rotation symmetry. This is attributable to the focus derivation at the azimuth in a plane in which the light beam is bent and the azimuth in a plane orthogonal thereto, and is because the focus position at the latter azimuth becomes further than the focus position at the former azimuth. Consequently, to reduce the creation of such astigmatism in a decentered reflecting surface, it is necessary to make the curvature in the plane orthogonal to the plane in which the light beam is bent shaper than the curvature in the latter plane. This corresponds to the fact that Rx/Ry in expression (1) is less than 1. In the present invention, the upper and lower limit values are provided to this to thereby achieve compatibility with the other optical performance. If in expression (1), the lower limit value is exceeded, the above-described astigmatism in pupil imaging will become excessively great and the aspect ratio in decentration distortion correction will be over-corrected, and this is not good. Also, if the upper limit value is exceeded, the above-described astigmatism will be under-corrected, and this is not good.

Also, it is preferable that the aspherical shape of the eyepiece reflecting surface become smaller in curvature from the vertex toward the margin in a direction orthogonal to a direction in which the light beam is bent. Speaking in FIG. 1, the direction in which the light beam is bent corresponds to y direction, and the direction orthogonal thereto corresponds to x direction. It is related to the aforedescribed distortion correction that the curvature becomes smaller toward the margin.

The example, in FIGS. 4A and 4B, the reflecting surface 14 and the reflecting surface 16 must direct the rays R4–R6 to the pupil position Psx in the vertical cross-section (FIG. 4B) so that the tangent of φ3 may be nearly double the tangent of φ2. Generally, when a reflecting surface is comprised of a spherical system, there is established in FIGS. 4A and 4B the inequality relation that $$(\tan\beta 3/\tan\beta 2) < (\tan\phi 3/\tan\phi 2).$$

To direct this into an equality relation, the x coordinates of the reflection point Pf of the ray R4 on the reflecting surface 14 must be made small relative to the reflection point Pe of the ray R5 on the reflecting surface 14. For this purpose, the curvature in the vertical direction at the reflection point Pc of the ray R4 on the eyepiece reflecting surface 16 can be made smaller than the paraxial curvature. It will do if such a relation is established relative to the whole angle of view and thus, it will be good if the reflecting surface 16 is of such a shape that the curvature in the vertical direction becomes shaper toward the margin.

The anamorphic aspherical surface in the present invention is defined by the following expression:

$$z = \frac{R(x)x^2 + R(y)y^2}{1 + \sqrt{1 - (1+KX)R(x)^2x^2 - (1+KY)R(y)^2y^2}} + \quad (A)$$

$$AR\{(1-AP)x^2 + (1+AP)y^2\}^2 + BR\{(1-BP)x^2 + (1+BP)y^2\}^3 +$$

$$CR\{(1-CP)x^2 + (1+CP)y^2\}^4 + DR\{(1-DP)x^2 + (1+DP)y^2\}^5$$

To make the curvature of the anamorphic aspherical surface in the eyepiece system gradually sharper from the vertex toward the margin as previously described, AR which is a low-order coefficient in expression (A) can assume a value of the same sign as the radius of curvature and which is not 0. Further, when one of R(x) and R(y) in expression (1) which are the radii of curvature in two directions orthogonal to each other which is greater in absolute value is defined as Rs, it is preferable that the aspherical coefficient AR of the eyepiece reflecting surface satisfy the following conditional expression:

$$0 < AR/Rs < e^{-8} \quad (2)$$

If the lower limit of expression (2) is exceeded, the above-described distortion correcting capability will become null, and if the upper limit of expression (2) is exceeded, not only distortion will be over-corrected, but also the cration of astigmatism and curvature of image field will become remarkable at the marginal angle of view, and this is not preferable.

The optical system of the image display apparatus of the present invention can also be used as the optical system of an image pickup apparatus. In this case, the eye point 17 in FIG. 1 can be the entrance pupil and an image pickup element such as a CCD can be disposed at the position of the image display means 11. If at this time, a stop is provided at the eye point 17 or at the pupil position of the relay optical system 12, the adjustment of the quantity of light will be possible. Focus adjustment can be effected by moving a part or the whole of the refracting system 13 which is not decentered in the direction of the optical axis or moving the image pickup element.

When an image pickup apparatus is thus provided by a construction converse to that of FIG. 1, the reflecting surface 16 becomes a primary imaging optical system and the relay optical system 12 becomes a relay optical system for secondarily forming the image formed on the primary imaging plane by the reflecting surface 16. This construction also is a reflecting optical system and therefore, the image pickup element can be disposed at any other position than in the direction of incidence the ray at the central angle of view has at the entrance pupil, and the degree of freedom of spatial disposition becomes higher.

If as an example, in addition to the decentered reflecting surface, a turn-back mirror is inserted in 5 front of the refracting relay system, a construction in which a light is turned back in a zigzag shape will become possible, and an image pickup system which is thin relative to the direction of incidence at the entrance pupil can be realized.

Some numerical value embodiments of the present invention will be shown below. Each optical system is shown in terms of data by the so-called converse trace in which an image is formed on the image display surface with the eye point as the entrance pupil.

The optical systems of the present invention each have at least one anamorphic aspherical surface in the eyepiece system or the relay system, and the shape thereof is prescribed by expression (A). The coordinates axes (x, y, z) in expression (A) are local coordinates systems with vertex coordinates on each surface as the origin, and the respective axes are defined as follows:

z: coordinates in which the vertex position of the reflecting surface is the origin and which form a tilt angle θi in a counter-clockwise direction in yz plane with respect to z direction which is the direction of the optical axis of the pupil;

y: coordinates in which the vertex position of the reflecting surface is the origin and which form 90° in the counter-clockwise direction in yz plane with respect to z direction;

x: coordinates in which the vertex of the reflecting surface is the origin and which is perpendicular to yz plane.

In the numerical value embodiments, the tilt angles of the i-th refracting surface and reflecting surface in yz plane are represented by an angle θi (unit is degree) in which the counter-clockwise direction relative to z axis is positive in yz plane. The amounts of shift ei of the i-th refracting surface and reflecting surface in yz plane are represented with y plus direction as the positive. Also, the vertex of each optical element is on yz plane, and there is not the tilt of the optical element in xz and xy planes.

Assuming that in the tables below, i is a suffix indicating the i-th optical element as counted in the order in which the light passes from the observer's pupil side to the display surface, Ri, Di, Ni and vi indicate the i-th radius of curvature, lens thickness or air gap distance, refractive index and abbe's number, respectively.

Figure 20:
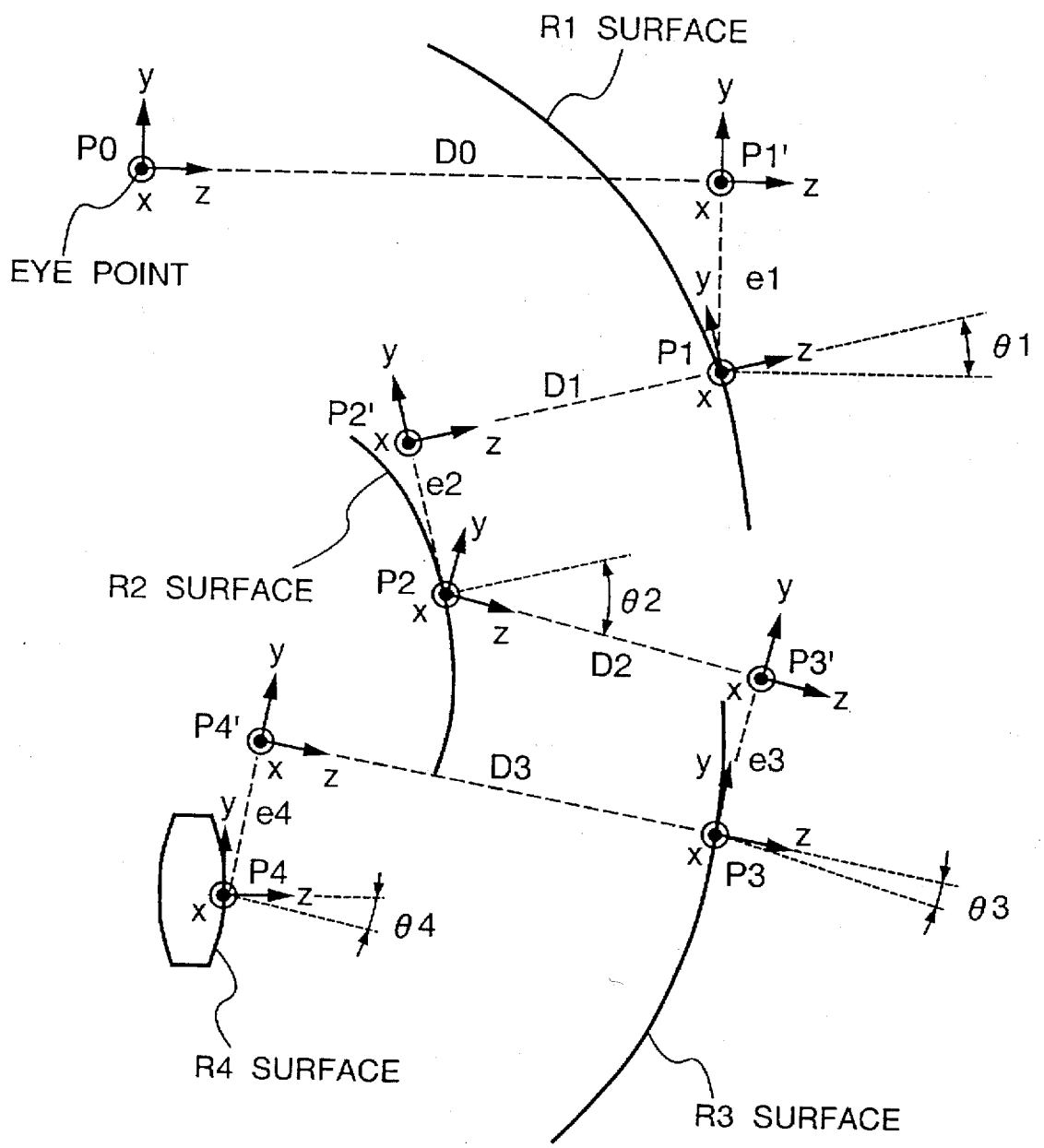
FIG. 20 is an illustration of a local coordinates system according to the present invention.

The local coordinates systems of these surfaces will now be described in detail with reference to FIG. 20. As shown in FIG. 20, the numerical value embodiments of the present invention define the positions of the respective surfaces in the order from the eye point toward the display surface. First, when the eye point is defined as R0 surface for the sake of convenience and a point P0 is determined at this position, a point P1' advanced by D0 in z plus direction of the local coordinates system at P0 becomes the origin of the local coordinates of R1 surface before the decentering thereof.

The local coordinates system at the point P1' is the origin as it has been parallel-moved to P1' in the coordinates system of the point P0. A point P1 further moved from this point by the amount of shift e1 of R1 surface in y direction is the final local origin of R1 surface. Here, the coordinates system is one in which the coordinates system of the point P1' has been rotated by a tilt angle $\theta 1$.

Consequently, the shape of R1 surface which is the reflecting surface is defined on this coordinates system by the above-described aspherical surface expression. In the same manner, from this point P1, a point P2' is determined by D1 and further, from e2 and $\theta 2$, the position of a point P2 is determined, and the shape of R2 surface is defined. By repeating this, the positions and postures up to the display surface are determined in succession.

Here, care should be taken about the fact that the point before decentering represented by the prime next to the reflecting surface is set in quite the opposite direction to the last time. Speaking with respect to FIG. 20, when the point P1' is to be determined from the point P0, it has been set in z plus direction of the point P0, whereas when the point P2' is to be determined from the point P1, it is set in z minus direction of the point P1.

Likewise, when a point P3' is to be determined from the point P2, it is set in z plus direction, and when a point P4' is to be determined from a point P3, it is set in z minus direction. Also, in the case of the refracting system, the direction immediately before is maintained and set. The sign of Ri is minus when the center of curvature is in z minus direction of each local coordinates system, and is plus when the center of curvature is in z plus direction.

Optical paths corresponding to Numerical Value Embodiments 1 to 5 are shown in FIGS. 5 to 9, lateral aberrations are shown in FIGS. 10A to 14F, and image shapes are shown in FIGS. 15 to 19. In the optical path views, the interior of the plane of the drawings sheet is the horizontal direction and a direction perpendicular to the plane of the drawing sheet is the vertical direction, and in the lateral aberration graphs, the image point position is represented by the angles of view in the horizontal direction and the vertical direction and moreover, the aberrations of the respective cross-sections in the horizontal direction and the vertical direction are described. In any of the embodiments, a reflecting surface indicated by one stage R2 is inserted between the eyepiece reflecting surface R1 and the reflecting surface R3 of the relay optical system.

Numerical Value Embodiment 1 is an embodiment in which two surfaces of the eyepiece reflecting surface R1 and the refracting surfaces of the relay optical system are aspherical surfaces, Numerical Value Embodiments 2 and 3 are embodiments in which the eyepiece reflecting surface R1 and the reflecting surface R3 of the relay optical system are aspherical surfaces, Numerical Value Embodiment 4 is an embodiment in which in addition to R1 and R3, the intermediate mirror R2 is made aspherical, and Numerical Value Embodiment 5 is an embodiment in which with R1–R3, the refracting surfaces of the relay optical system are made aspherical. In any of these embodiments, the dimension of the display surface is 14.24 mm in the horizontal direction and 10.8 mm in the vertical direction, the visibility is −1 diopter, and the angle of view obtained is 30.0° horizontally and 22.7° vertically.

It is Table 1 that shows the values of conditional expressions (1) and (2) in each numerical value embodiment. It is seen that in any embodiment, the numerical values are within the ranges of the conditional expressions.

| [Numerical Value Embodiment 1] | | | | | | | | |
|---|---|---|---|---|---|---|---|---|
| i | Ri(y) | Ri(x) | Di | $\theta i$ | ei | Ni | vi | |
| | | | 91.49 | 0.00 | 0.00 | 1 | | eye point |
| 1 | −175.080 | −108.521 | 65.00 | 0.00 | −50.00 | 1 | | reflecting surface |
| 2 | ∞ | | 55.00 | 0.00 | 0.00 | 1 | | reflecting surface |
| 3 | −185.663 | | 70.17 | −11.15 | 0.00 | 1 | | reflecting surface |
| 4 | −28.812 | −18.489 | 6.00 | 9.69 | −40.31 | 1.77250 | 49.60 | |
| 5 | −60.144 | | 3.81 | 0.00 | 0.00 | 1 | | |
| 6 | −152.574 | 46.267 | 2.00 | 0.00 | 0.00 | 1.76182 | 26.52 | |
| 7 | −19.693 | | 2.87 | 0.00 | 0.00 | 1 | | |
| 8 | −37.357 | | 6.00 | 0.00 | 0.00 | 1.83481 | 42.72 | |
| 9 | 167.323 | | 0.10 | 0.00 | 0.00 | 1 | | |
| 10 | −22.281 | | 6.00 | 0.00 | 0.00 | 1.51633 | 64.15 | |
| 11 | −214.187 | | 27.22 | 0.00 | 0.00 | 1 | | |
| 12 | ∞ | | | 0.00 | 0.00 | | | display surface | shape of aspherical surface
R1 surface
    KY = 0.73595    KX = −1.21280
    AR = −0.18507e-7    BR = 0.90687e-12    CR = −0.22744e-16    DR = 0.21276e-21
    AP = 0.93838    BP = −0.18642    CP = 0.51033    DP = 0.21690e1
R4 surface
    KY = 1.85712    KX = 0.97342
    AR = −0.21626e-5    BR = 0.13904e-8    CR = 0    DR = 0
    AP = 0.63396    BP = 0.43790e1    CP = 0    DP = 0
R6 surface
    KY = 285.845    KX = −50.4476
    AR = 0.32357e-4    BR = 0.13661e-6    CR = 0    DR = 0
    AP = −0.68959    BP = −0.31621    CP = 0    DP = 0
dimension of display surface    horizontal 14.24 mm, vertical 10.8 mm
angle of view    horizontal 30.0°, vertical 22.7°
diopter    −1

[Numerical Value Embodiment 2]

| i | Ri(y) | Ri(x) | Di | θi | ei | Ni | vi | |
|---|---|---|---|---|---|---|---|---|
|   |          |          | 91.49 | 0.00  | 0.00   | 1       |       | eye point |
| 1 | −181.396 | −123.263 | 60.00 | 0.00  | −50.00 | 1       |       | reflecting surface |
| 2 | ∞        |          | 60.00 | 0.00  | 0.00   | 1       |       | reflecting surface |
| 3 | −222.744 | −171.958 | 70.00 | −4.00 | 0.00   | 1       |       | reflecting surface |
| 4 | −19.386  |          | 6.00  | 17.00 | −50.00 | 1.77250 | 49.60 | |
| 5 | −34.617  |          | 3.40  | 0.00  | 0.00   | 1       |       | |
| 6 | 25.127   |          | 2.00  | 0.00  | 0.00   | 1.76182 | 26.52 | |
| 7 | −25.405  |          | 3.20  | 0.00  | 0.00   | 1       |       | |
| 8 | 88.294   |          | 6.00  | 0.00  | 0.00   | 1.51633 | 64.15 | |
| 9 | 20.868   |          | 0.20  | 0.00  | 0.00   | 1       |       | |
| 10 | −51.650 |          | 6.00  | 0.00  | 0.00   | 1.77250 | 49.60 | |
| 11 | 36.149  |          | 38.13 | 0.00  | 0.00   | 1       |       | |
| 12 | ∞       |          |       | 0.00  | 0.00   |         |       | display surface | shape of aspherical surface
R1 surface
    $KY = 1.50417$     $KX = 0.31594$
    $AR = -0.12234e-7$   $BR = -0.28355e-10$   $CR = 0.42105e-16$   $DR = -0.25941e-22$
    $AP = -0.29784e1$    $BP = -0.12988e1$     $CP = 0.12112e1$     $DP = 0.38456e1$
R3 surface
    $KY = -12.51111$   $KX = 17.1395$
    $AR = -0.19001e-9$   $BR = -0.70969e-13$   $CR = 0.26402e-16$   $DR = -0.19882e-19$
    $AP = 0.35369e2$     $BP = -0.10352e2$     $CP = 0.88926$       $DP = 0.15779e1$
dimension of display surface     horizontal 14.24 mm, vertical 10.8 mm
angle of view     horizontal 30.0°, vertical 22.7°
diopter     −1

[Numerical Value Embodiment 3]

| i | Ri(y) | Ri(x) | Di | θi | ei | Ni | vi | |
|---|---|---|---|---|---|---|---|---|
|   |          |          | 91.49 | 0.00  | 0.00   | 1       |       | eye point |
| 1 | −156.961 | −86.271  | 65.00 | 0.00  | −50.00 | 1       |       | reflecting surface |
| 2 | ∞        |          | 55.00 | 0.00  | 0.00   | 1       |       | reflecting surface |
| 3 | −185.663 | −111.166 | 70.17 | −4.00 | 0.00   | 1       |       | reflecting surface |
| 4 | −25.633  |          | 6.00  | 8.48  | −47.06 | 1.77250 | 49.60 | |
| 5 | −60.144  |          | 3.82  | 0.00  | 0.00   | 1       |       | |
| 6 | −724.229 |          | 2.00  | 0.00  | 0.00   | 1.76182 | 26.52 | |
| 7 | −24.477  |          | 2.86  | 0.00  | 0.00   | 1       |       | |
| 8 | −45.951  |          | 6.00  | 0.00  | 0.00   | 1.83481 | 42.72 | |
| 9 | 117.716  |          | 0.10  | 0.00  | 0.00   | 1       |       | |
| 10 | −20.485 | −52.318  | 6.00  | 0.00  | 0.00   | 1.51633 | 64.15 | |
| 11 | ∞       |          | 19.54 | 0.00  | 0.00   | 1       |       | |
| 12 | ∞       |          |       | 0.00  | 0.00   |         |       | display surface | shape of aspherical surface
R1 surface
    $KY = 0.38370$     $KX = -0.75699$
    $AR = -0.12152e-7$   $BR = 0.80980e-12$   $CR = 0.98768e-17$   $DR = 0.20922e-21$
    $AP = -0.86794$     $BP = 0.25928$       $CP = 0.51033$       $DP = 0.16716e1$
R3 surface
    $KY = -0.90982$    $KX = -3.48506$
    $AR = -0.19007e-9$   $BR = -0.19393e-11$   $CR = -0.14802e-14$   $DR = -0.35511e-17$
    $AP = 0.89943e1$     $BP = 0.73518$       $CP = -0.40682e-1$   $DP = -0.17065e1$
R10 surfaae
    $KY = 0$     $KY = 0$
    $AR = 0$     $BR = 0$     $CR = 0$     $DR = 0$
    $AP = 0$     $BP = 0$     $CP = 0$     $DP = 0$
dimension of display surface     horizontal 14.24 mm, vertical 10.8 mm
angle of view     horizontal 30.0°, vertical 22.7°
diopter     −1

[Numerical Value Embodiment 4]

| i | Ri(y) | Ri(x) | Di | θi | ei | Ni | vi | |
|---|---|---|---|---|---|---|---|---|
|  |  |  | 91.49 | 0.00 | 0.00 | 1 |  | eye point |
| 1 | −108.000 | −92.277 | 60.00 | −3.00 | −50.00 | 1 |  | reflecting surface |
| 2 | −184.678 | −57.588 | 60.00 | 5.00 | 5.00 | 1 |  | reflecting surface |
| 3 | −189.690 | −110.551 | 70.00 | −6.00 | 5.00 | 1 |  | reflecting surface |
| 4 | −53.944 |  | 6.00 | 16.00 | −72.00 | 1.60311 | 60.70 |  |
| 5 | 78.141 |  | 3.80 | 0.00 | 0.00 | 1 |  |  |
| 6 | 26.685 |  | 2.00 | 0.00 | 0.00 | 1.84666 | 23.78 |  |
| 7 | −1644.838 |  | 3.20 | 0.00 | 0.00 | 1 |  |  |
| 8 | 135.050 |  | 6.00 | 0.00 | 0.00 | 1.83481 | 42.72 |  |
| 9 | 29.276 |  | 0.20 | 0.00 | 0.00 | 1 |  |  |
| 10 | −37.331 |  | 6.00 | 0.00 | 0.00 | 1.51633 | 64.15 |  |
| 11 | ∞ |  | 35.69 | 0.00 | 0.00 | 1 |  |  |
| 12 | ∞ |  |  | 0.00 | 0.00 |  |  | display surface | shape of aspherical surface
R1 surface
    $KY = 0.000113$    $KX = -1.32672$
    $AR = -0.26194e-6$  $BR = -0.14320e-11$  $CR = 0.83453e-17$  $DR = -0.16208e-18$
    $AP = -0.70916$  $BP = -0.18377e1$  $CP = -0.30434e1$  $DP = -0.31301$
R2 surface
    $KY = 51.3727$    $KX = -15.4605$
    $AR = 0.38955e-7$  $BR = 0.63035e-8$  $CR = 0.55631e-11$  $DR = -0.17905e-15$
    $AP = -0.49725e1$  $BP = -0.15209e1$  $CP = -0.22268$  $DP = -0.33205e1$
R3 surface
    $KY = 0.89831$    $KX = 1.29972$
    $AR = -0.28361e-10$  $BR = -0.23647e-13$  $CR = -0.10318e-15$  $DR = 0.17923e-23$
    $AP = -0.64292e2$  $BP = -0.83647e1$  $CP = 0.98836$  $DP = 0.81021e1$
dimension of display surface    horizontal 14.24 mm, vertical 10.8 mm
angle of view    horizontal 30.0°, vertical 22.7°
diopter    −1

[Numerical Value Embodiment 5]

| i | Ri(y) | Ri(x) | Di | θi | ei | Ni | vi | |
|---|---|---|---|---|---|---|---|---|
|  |  |  | 91.49 | 0.00 | 0.00 | 1 |  | eye point |
| 1 | −108.000 | −87.214 | 60.00 | −3.00 | −50.00 | 1 |  | reflecting surface |
| 2 | −228.906 | −47.286 | 60.00 | 5.00 | 5.00 | 1 |  | reflecting surface |
| 3 | −191.211 | −101.385 | 70.00 | −6.00 | 5.00 | 1 |  | reflecting surface |
| 4 | −52.233 | −66.319 | 6.00 | 10.00 | −72.00 | 1.60311 | 60.70 |  |
| 5 | 153.465 |  | 3.80 | 0.00 | 0.00 | 1 |  |  |
| 6 | 35.350 |  | 2.00 | 0.00 | 0.00 | 1.84666 | 23.78 |  |
| 7 | −137.484 |  | 3.20 | 0.00 | 0.00 | 1 |  |  |
| 8 | 183.772 |  | 6.00 | 0.00 | 0.00 | 1.83481 | 42.72 |  |
| 9 | 27.835 |  | 0.20 | 0.00 | 0.00 | 1 |  |  |
| 10 | −39.346 |  | 6.00 | 0.00 | 0.00 | 1.51633 | 64.15 |  |
| 11 | ∞ |  | 35.82 | 0.00 | 0.00 | 1 |  |  |
| 12 | ∞ |  |  | 0.00 | 0.00 |  |  | display surface | shape of aspherical surface
R1 surface
    $KY = -0.02838$    $KX = -1.61894$
    $AR = -0.29438e-6$  $BR = -0.65797e-12$  $CR = 0.12907e-16$  $DR = -0.19326e-19$
    $AP = -0.73373$  $BP = -0.24222e1$  $CP = -0.32401e1$  $DP = 0.17026$
R2 surface
    $KY = 90.6074$    $KX = -12.8634$
    $AR = 0.10163e-6$  $BR = 0.30115e-8$  $CR = 0.23267e-10$  $DR = -0.29875e-15$
    $AP = -0.42594e1$  $BP = -0.19488e1$  $CP = -0.63018$  $DP = -0.32340e1$
R3 surface
    $KY = 2.82979$    $KX = -0.85802$
    $AR = -0.21823e-10$  $BR = -0.33311e-13$  $CR = -0.15387e-15$  $DR = 0.34735e-23$
    $AP = -0.56451e2$  $BP = -0.91249e1$  $CP = 0.11647e1$  $DP = 0.85762e1$
R4 surface
    $KY = 1.19468$    $KX = -20.8847$
    $AR = 0.42155e-6$  $BR = -0.77195e-10$  $CR = 0$  $DR = 0$
    $AP = -0.12987e1$  $BP = -0.83262e1$  $CP = 0$  $DP = 0$
dimension of display surface    horizontal 14.24 mm, vertical 10.8 mm
angle of view    horizontal 30.0°, vertical 22.7°
diopter    −1

TABLE 1

| Numerical value Embodiment | Surface | Conditional Expression (1) | Conditional Expression (2) |
|---|---|---|---|
| 1 | 1 | 0.62 | 1.06e-10 |
| 2 | 1 | 0.68 | 6.74e-11 |
| 2 | 3 | 0.77 | |
| 3 | 1 | 0.55 | 7.74e-11 |
| 3 | 3 | 0.60 | |
| 4 | 1 | 0.85 | 2.43e-9 |
| 4 | 3 | 0.58 | |
| 5 | 1 | 0.81 | 2.73e-9 |
| 5 | 3 | 0.53 | |

What is claimed is:

1. An image display apparatus disposed near an observer's head for observing an image displayed on image display means as an enlarged virtual image, said image display apparatus comprising:

a relay optical system for causing the displayed image by said image display means to be intermediately formed, said relay optical system having at least one decentered reflecting surface for reflecting a light beam from said image display means, and at least one lens of an anamorphic aspherical shape differing in curvature in any orthogonal direction; and an eyepiece optical system for directing the image by said relay optical system to the observer's pupil, said eyepiece optical system having at least one decentered reflecting surface which is an anamorphic aspherical surface of a concave shape for reflecting the light beam from said relay optical system.

2. An apparatus according to claim 1, wherein the decentered reflecting surface of said relay optical system is an anamorphic aspherical surface.

3. An apparatus according to claim 1, further having a mirror surface disposed in the optical path between the decentered reflecting surface of said eyepiece optical system and the decentered reflecting surface of said relay optical system.

4. An apparatus according to claim 3, wherein said mirror surface is a convex anamorphic aspherical surface.

5. An apparatus according to claim 1, satisfying $$0.5 < Rx/Ry < 0.9,$$

where Rx and Ry are the paraxial radii of curvature in two orthogonal directions at the vertex of the anamorphic aspherical surface which is the concave reflecting surface.

6. An apparatus according to claim 5, wherein when relative to the direction z of the optical axis, the shape of the anamorphic aspherical surface of said eyepiece system is defined as $$z = \frac{R(x)x^2 + R(y)y^2}{1 + \sqrt{1 - (1+KX)R(x)^2x^2 - (1+KY)R(y)^2y^2}} +$$

$$AR\{(1-AP)x^2 + (1+AP)y^2\}^2 + BR\{(1-BP)x^2 + (1+BP)y^2\}^3 +$$

$$CR\{(1-CP)x^2 + (1+CP)y^2\}^4 + DR\{(1-DP)x^2 + (1+DP)y^2\}^5$$

the aspherical surface coefficient AR is a value of the same sign as the radius of curvature and which is not 0, and when the curvature in two orthogonal directions is defined as Rs the image display apparatus satisfies $$0 < AR/Rs < e^{-8}.$$

7. An apparatus according to claim 1, wherein in the anamorphic aspherical surface which is the concave reflecting surface, the curvature in a direction perpendicular to the direction in which the light beam is bent by the decentration of said reflecting surface is smaller toward the margin.

8. An apparatus according to claim 1, wherein the decentered reflecting surface of said eyepiece optical system is a beam splitter.

9. An image pickup apparatus for forming the image of an object on the surface of an image pickup element, comprising:

a reflecting system for primarily imaging a light beam from said object, said reflecting system having at least one decentered reflecting surface which is an anamorphic aspherical surface of a concave surface shape for reflecting the light beam from said object; and a relay optical system for directing the image by said reflecting system onto the surface of said image pickup element, said relay optical system having at least one decentered reflecting surface for reflecting the light beam from said reflecting system, and at least one lens of an anamorphic aspherical shape differing in curvature in any orthogonal direction.

10. An apparatus according to claim 9, wherein the decentered reflecting surface of said relay optical system is an anamorphic aspherical surface.

11. An apparatus according to claim 9, further comprising a mirror surface disposed in the optical path between the decentered reflecting surface of said reflecting system and the decentering reflecting surface of said relay optical system.

* * * * *

UNITED STATES PATENT AND TRADEMARK OFFICE
CERTIFICATE OF CORRECTION

PATENT NO. : 5,687,025
DATED : November 11, 1997
INVENTOR(S) : Norihiro Nanba

It is certified that errors appear in the above-identified patent and that said Letters Patent is hereby corrected as shown below:

Column 4, line 8, change "$+BR\{(1-BP)x^2 + (1-BP)y^2\}^3$" to -- $+BR\{(1-BP)x^2 + (1+BP)y^2\}^3$ --.

Column 7, line 38, after "is" delete "10".

Col. 12, line 15, after "in" delete "5".

Signed and Sealed this

Twenty-third Day of June, 1998

Attest:

Attesting Officer

BRUCE LEHMAN

Commissioner of Patents and Trademarks